United States Patent
Gasparakis et al.

(10) Patent No.: US 12,119,991 B2
(45) Date of Patent: *Oct. 15, 2024

(54) PROGRAMMABLE PROTOCOL PARSER FOR NIC CLASSIFICATION AND QUEUE ASSIGNMENTS

(71) Applicant: Intel Corporation, Santa Clara, CA (US)

(72) Inventors: Iosif Gasparakis, Hillsboro, OR (US); Ronen Chayat, Haifa (IL); John Fastabend, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,864

(22) Filed: Jun. 10, 2022

(65) Prior Publication Data

US 2022/0321404 A1 Oct. 6, 2022

Related U.S. Application Data

(60) Continuation of application No. 16/519,873, filed on Jul. 23, 2019, now Pat. No. 11,394,610, which is a
(Continued)

(51) Int. Cl.
*H04L 41/082* (2022.01)
*H04L 67/00* (2022.01)
*H04L 67/04* (2022.01)

(52) U.S. Cl.
CPC ............ *H04L 41/082* (2013.01); *H04L 67/04* (2013.01); *H04L 67/34* (2013.01)

(58) Field of Classification Search
None
See application file for complete search history.

(56) References Cited

U.S. PATENT DOCUMENTS

| 5,243,596 A | 9/1993 | Port et al. |
| 5,642,483 A | 6/1997 | Topper |

(Continued)

FOREIGN PATENT DOCUMENTS

| CN | 1522006 | 8/2004 |
| CN | 1589551 | 3/2005 |

(Continued)

OTHER PUBLICATIONS

Advisory Action for U.S. Appl. No. 15/835,238, dated Nov. 22, 2019, 3 pages.
(Continued)

*Primary Examiner* — Faiyazkhan Ghafoerkhan
(74) *Attorney, Agent, or Firm* — Essential Patents Group, LLP; Christopher K. Gagne

(57) ABSTRACT

Technologies for controlling operation of a compute node coupled to a computer network via a computing device that includes communications for communicating with the computer network and persistent instructions such as firmware for providing control functions to the computing device, wherein the control functions being defined at least in part by protocol data. An update control module of the computing device may receive update data from a remote node in the computer network via the communications, wherein the update data comprising new protocol data for the persistent instructions. A protocol parser module may parse the update data and generate metadata relating to the update data. A classifier module may receive rules for the control functions, wherein the rules are based at least in part on the update data and metadata. A compiler may compile the parsed update data to the persistent instructions for providing new control functions to the computing device based at least in part on the received rules.

30 Claims, 6 Drawing Sheets

Related U.S. Application Data continuation of application No. 16/026,318, filed on Jul. 3, 2018, now Pat. No. 10,361,914, which is a division of application No. 14/583,664, filed on Dec. 27, 2014, now Pat. No. 10,015,048.

(56) References Cited

U.S. PATENT DOCUMENTS

| | | | |
|---|---|---|---|
| 5,784,003 | A | 7/1998 | Dahlgren |
| 6,157,955 | A | 12/2000 | Narad et al. |
| 6,442,172 | B1 | 8/2002 | Wallner et al. |
| 6,453,360 | B1* | 9/2002 | Muller .............. H04L 69/167 |
| | | | 709/236 |
| 6,735,679 | B1 | 5/2004 | Herbst et al. |
| 6,836,483 | B1* | 12/2004 | Lee .................. H04L 12/5601 |
| | | | 370/395.31 |
| 6,948,099 | B1* | 9/2005 | Tallam ............. G06F 11/1417 |
| | | | 714/38.14 |
| 6,976,149 | B1 | 12/2005 | Brandt et al. |
| 6,980,552 | B1 | 12/2005 | Belz et al. |
| 7,046,685 | B1 | 5/2006 | Matsuoka et al. |
| 7,062,571 | B1 | 6/2006 | Dale et al. |
| 7,177,276 | B1 | 2/2007 | Epps et al. |
| 7,203,740 | B1 | 4/2007 | Putzolu et al. |
| 7,389,462 | B1 | 6/2008 | Wang et al. |
| 7,421,688 | B1* | 9/2008 | Righi ...................... H04L 67/34 |
| | | | 717/172 |
| 7,492,714 | B1 | 2/2009 | Liao et al. |
| 7,499,941 | B2 | 3/2009 | Michaeli et al. |
| 7,539,777 | B1 | 5/2009 | Aitken |
| 7,633,880 | B2 | 12/2009 | Bang et al. |
| 7,643,486 | B2 | 1/2010 | Belz et al. |
| 7,826,470 | B1* | 11/2010 | Aloni ................... H04L 49/90 |
| | | | 370/463 |
| 7,872,774 | B2* | 1/2011 | Okamoto .......... H04N 1/00904 |
| | | | 358/1.16 |
| 7,873,959 | B2* | 1/2011 | Zhu ......................... G06F 8/65 |
| | | | 717/172 |
| 7,889,750 | B1 | 2/2011 | Parker |
| 7,904,642 | B1 | 3/2011 | Gupta et al. |
| 7,961,734 | B2 | 6/2011 | Panwar et al. |
| 8,077,611 | B2 | 12/2011 | Bettink et al. |
| 8,094,659 | B1 | 1/2012 | Arad |
| 8,125,810 | B2* | 2/2012 | Bosshart .............. G11C 15/04 |
| | | | 365/49.1 |
| 8,155,135 | B2* | 4/2012 | Aloni ................ H04L 49/9063 |
| | | | 370/473 |
| 8,514,855 | B1 | 8/2013 | Robertson et al. |
| 8,527,613 | B2* | 9/2013 | Malone ............... G06F 21/572 |
| | | | 709/222 |
| 8,593,955 | B2 | 11/2013 | Yano et al. |
| 8,638,793 | B1 | 1/2014 | Ben-Mayor et al. |
| 8,693,374 | B1 | 4/2014 | Murphy et al. |
| 8,738,860 | B1 | 5/2014 | Griffin et al. |
| 8,788,512 | B2 | 7/2014 | Asaad et al. |
| 8,798,047 | B1 | 8/2014 | Wadekar et al. |
| 8,971,338 | B2 | 3/2015 | Mishra et al. |
| 9,049,153 | B2 | 6/2015 | Casado et al. |
| 9,049,271 | B1 | 6/2015 | Hobbs et al. |
| 9,055,004 | B2 | 6/2015 | Edsall et al. |
| 9,055,114 | B1 | 6/2015 | Talaski et al. |
| 9,112,818 | B1 | 8/2015 | Arad et al. |
| 9,124,644 | B2 | 9/2015 | Patel et al. |
| 9,213,537 | B2* | 12/2015 | Bandakka ........... G06F 11/1433 |
| 9,258,224 | B2 | 2/2016 | Bosshart et al. |
| 9,276,846 | B2 | 3/2016 | Goyal et al. |
| 9,294,386 | B2 | 3/2016 | Narad |
| 9,298,446 | B2* | 3/2016 | Chang ...................... G06F 8/65 |
| 9,438,505 | B1* | 9/2016 | Zhou ....................... H04L 47/10 |
| 9,450,817 | B1 | 9/2016 | Bahadur et al. |
| 9,467,363 | B2 | 10/2016 | Gao |
| 9,544,231 | B2 | 1/2017 | Bosshart et al. |
| 9,590,925 | B2 | 3/2017 | Yamashita |
| 9,660,904 | B2* | 5/2017 | Kotalwar ................ H04L 45/64 |
| 9,686,209 | B1 | 6/2017 | Arad et al. |
| 9,692,690 | B2 | 6/2017 | Joshi et al. |
| 9,712,439 | B2 | 7/2017 | Bosshart et al. |
| 9,755,932 | B1 | 9/2017 | Godbole et al. |
| 9,825,862 | B2 | 11/2017 | Bosshart |
| 9,826,071 | B2 | 11/2017 | Bosshart |
| 9,838,268 | B1 | 12/2017 | Mattson |
| 9,888,033 | B1 | 2/2018 | Li et al. |
| 9,891,898 | B1 | 2/2018 | Tonsing |
| 9,912,610 | B2 | 3/2018 | Bosshart et al. |
| 9,912,774 | B2 | 3/2018 | Daly et al. |
| 9,923,816 | B2 | 3/2018 | Kim et al. |
| 9,960,956 | B1 | 5/2018 | Johnson et al. |
| 10,009,276 | B2 | 6/2018 | Bosshart et al. |
| 10,015,048 | B2* | 7/2018 | Gasparakis ............. H04L 67/34 |
| 10,044,646 | B1 | 8/2018 | Detwiler |
| 10,091,090 | B2* | 10/2018 | Chang ................ H04L 12/6418 |
| 10,091,137 | B2 | 10/2018 | Tran et al. |
| 10,135,734 | B1 | 11/2018 | Singh et al. |
| 10,225,381 | B1 | 3/2019 | Bosshart |
| 10,291,555 | B2 | 5/2019 | K et al. |
| 10,341,242 | B2 | 7/2019 | Srinivasan et al. |
| 10,361,914 | B2* | 7/2019 | Gasparakis ............. H04L 67/34 |
| 10,412,018 | B1 | 9/2019 | Feng et al. |
| 10,419,242 | B1 | 9/2019 | Tonsing et al. |
| 10,419,366 | B1 | 9/2019 | Kim et al. |
| 10,432,527 | B1 | 10/2019 | Bosshart |
| 10,686,735 | B1 | 6/2020 | Watson |
| 10,892,939 | B2 | 1/2021 | Castaldelli et al. |
| 10,944,696 | B2* | 3/2021 | Galles ..................... H04L 49/50 |
| 11,018,977 | B2* | 5/2021 | Hood ....................... H04L 49/25 |
| 11,388,053 | B2* | 7/2022 | Gasparakis ............. H04L 41/342 |
| 11,394,610 | B2* | 7/2022 | Gasparakis ............. H04L 41/082 |
| 11,394,611 | B2* | 7/2022 | Gasparakis ............. H04L 67/34 |
| 11,863,467 | B2* | 1/2024 | Galles ..................... H04L 41/5019 |
| 2001/0043611 | A1 | 11/2001 | Kadambi et al. |
| 2002/0001356 | A1 | 1/2002 | Shenoi |
| 2002/0136163 | A1 | 9/2002 | Kawakami et al. |
| 2002/0172210 | A1 | 11/2002 | Wolrich et al. |
| 2003/0005103 | A1* | 1/2003 | Narad ................... G06F 9/3885 |
| | | | 709/201 |
| 2003/0009466 | A1 | 1/2003 | Ta et al. |
| 2003/0043825 | A1* | 3/2003 | Magnussen ......... H04L 49/3009 |
| | | | 370/389 |
| 2003/0046414 | A1 | 3/2003 | Pettyjohn et al. |
| 2003/0046429 | A1 | 3/2003 | Sonksen |
| 2003/0063345 | A1 | 4/2003 | Fossum et al. |
| 2003/0107996 | A1 | 6/2003 | Black et al. |
| 2003/0118022 | A1 | 6/2003 | Kulkarni et al. |
| 2003/0147401 | A1* | 8/2003 | Kyronaho ............... H04L 69/24 |
| | | | 370/395.41 |
| 2003/0154358 | A1 | 8/2003 | Seong et al. |
| 2003/0167373 | A1* | 9/2003 | Winters ................... G06F 8/654 |
| | | | 711/104 |
| 2003/0219026 | A1 | 11/2003 | Sun et al. |
| 2004/0024894 | A1 | 2/2004 | Osman et al. |
| 2004/0031029 | A1* | 2/2004 | Lee ............................ G06F 8/65 |
| | | | 717/176 |
| 2004/0042477 | A1 | 3/2004 | Bitar et al. |
| 2004/0105384 | A1 | 6/2004 | Gallezot et al. |
| 2004/0123220 | A1 | 6/2004 | Johnson et al. |
| 2004/0165588 | A1 | 8/2004 | Pandya |
| 2004/0213156 | A1 | 10/2004 | Smallwood et al. |
| 2005/0013251 | A1 | 1/2005 | Wang et al. |
| 2005/0041590 | A1 | 2/2005 | Olakangil et al. |
| 2005/0060428 | A1 | 3/2005 | Corl et al. |
| 2005/0078651 | A1 | 4/2005 | Lee et al. |
| 2005/0086353 | A1 | 4/2005 | Shirakawa et al. |
| 2005/0108518 | A1* | 5/2005 | Pandya ..................... H04L 63/20 |
| | | | 713/153 |
| 2005/0120173 | A1 | 6/2005 | Minowa |
| 2005/0129059 | A1 | 6/2005 | Jiang et al. |
| 2005/0135399 | A1 | 6/2005 | Baden et al. |
| 2005/0147095 | A1* | 7/2005 | Guerrero ............... H04L 49/201 |
| | | | 370/390 |
| 2005/0149823 | A1 | 7/2005 | Lee |
| 2005/0198531 | A1 | 9/2005 | Kaniz et al. |
| 2005/0243852 | A1 | 11/2005 | Bitar et al. |
| 2006/0002386 | A1 | 1/2006 | Yik et al. |

(56) References Cited

U.S. PATENT DOCUMENTS

| | | | |
|---|---|---|---|
| 2006/0039372 A1* | 2/2006 | Sarkinen | H04Q 11/04 370/395.5 |
| 2006/0039374 A1 | 2/2006 | Belz et al. | |
| 2006/0050690 A1 | 3/2006 | Epps et al. | |
| 2006/0072480 A1 | 4/2006 | Deval et al. | |
| 2006/0092857 A1 | 5/2006 | Ansari et al. | |
| 2006/0114895 A1 | 6/2006 | Anand et al. | |
| 2006/0114914 A1 | 6/2006 | Anand et al. | |
| 2006/0117126 A1 | 6/2006 | Leung et al. | |
| 2006/0174242 A1* | 8/2006 | Zhu | G06F 8/65 717/172 |
| 2006/0277346 A1 | 12/2006 | Doak et al. | |
| 2007/0008985 A1 | 1/2007 | Lakshmanamurthy et al. | |
| 2007/0050426 A1* | 3/2007 | Dubal | G06F 8/65 |
| 2007/0055664 A1 | 3/2007 | Michaeli et al. | |
| 2007/0104102 A1 | 5/2007 | Opsasnick | |
| 2007/0104211 A1 | 5/2007 | Opsasnick | |
| 2007/0153796 A1 | 7/2007 | Kesavan et al. | |
| 2007/0195761 A1 | 8/2007 | Tatar et al. | |
| 2007/0195773 A1 | 8/2007 | Tatar et al. | |
| 2007/0208876 A1 | 9/2007 | Davis | |
| 2007/0230493 A1 | 10/2007 | Dravida et al. | |
| 2007/0236734 A1* | 10/2007 | Okamoto | H04N 1/00904 358/1.16 |
| 2007/0280277 A1 | 12/2007 | Lund et al. | |
| 2008/0082792 A1 | 4/2008 | Vincent et al. | |
| 2008/0130670 A1 | 6/2008 | Kim et al. | |
| 2008/0144662 A1* | 6/2008 | Marcondes | H04L 69/16 370/469 |
| 2008/0175449 A1 | 7/2008 | Fang et al. | |
| 2008/0285571 A1 | 11/2008 | Arulambalam et al. | |
| 2009/0006605 A1 | 1/2009 | Chen et al. | |
| 2009/0096797 A1 | 4/2009 | Du et al. | |
| 2009/0106523 A1 | 4/2009 | Steiss | |
| 2009/0180475 A1 | 7/2009 | Hashimoto | |
| 2010/0085891 A1 | 4/2010 | Kind et al. | |
| 2010/0128735 A1 | 5/2010 | Lipschutz | |
| 2010/0135158 A1 | 6/2010 | Adams | |
| 2010/0140364 A1 | 6/2010 | Nordberg et al. | |
| 2010/0145475 A1 | 6/2010 | Bartels et al. | |
| 2010/0150164 A1 | 6/2010 | Ma | |
| 2010/0182920 A1 | 7/2010 | Matsuoka | |
| 2010/0191951 A1* | 7/2010 | Malone | G06F 8/65 717/172 |
| 2010/0228733 A1* | 9/2010 | Harrison | G06F 16/31 707/739 |
| 2010/0238812 A1 | 9/2010 | Boutros et al. | |
| 2010/0312941 A1* | 12/2010 | Aloni | H04L 49/9063 710/310 |
| 2011/0080916 A1* | 4/2011 | Davies | H04L 49/9094 370/389 |
| 2011/0149776 A1* | 6/2011 | Park | H04L 45/00 370/252 |
| 2011/0149960 A1 | 6/2011 | Gutierrez | |
| 2012/0033550 A1 | 2/2012 | Yano et al. | |
| 2012/0155395 A1* | 6/2012 | Yadav | H04L 41/0893 370/328 |
| 2012/0159235 A1 | 6/2012 | Suganthi et al. | |
| 2012/0170585 A1 | 7/2012 | Mehra et al. | |
| 2012/0173661 A1 | 7/2012 | Mahaffey et al. | |
| 2012/0177047 A1 | 7/2012 | Roitshtein | |
| 2012/0284438 A1 | 11/2012 | Zievers | |
| 2013/0003556 A1 | 1/2013 | Boden et al. | |
| 2013/0028265 A1 | 1/2013 | Ronchetti et al. | |
| 2013/0100951 A1 | 4/2013 | Ishizuka | |
| 2013/0108264 A1 | 5/2013 | Deruijter et al. | |
| 2013/0124491 A1 | 5/2013 | Pepper et al. | |
| 2013/0163426 A1 | 6/2013 | Beliveau et al. | |
| 2013/0163427 A1 | 6/2013 | Beliveau et al. | |
| 2013/0163475 A1 | 6/2013 | Beliveau et al. | |
| 2013/0166703 A1 | 6/2013 | Hammer et al. | |
| 2013/0227051 A1 | 8/2013 | Khakpour et al. | |
| 2013/0227519 A1* | 8/2013 | Maleport | H04L 43/12 717/106 |
| 2013/0290622 A1 | 10/2013 | Dey et al. | |
| 2013/0315054 A1 | 11/2013 | Shamis et al. | |
| 2013/0318107 A1 | 11/2013 | Asaad et al. | |
| 2013/0346814 A1 | 12/2013 | Zadigian et al. | |
| 2014/0033489 A1 | 2/2014 | Kawashima | |
| 2014/0040527 A1 | 2/2014 | Kanigicheria et al. | |
| 2014/0043974 A1 | 2/2014 | Kwan et al. | |
| 2014/0050002 A1* | 2/2014 | Sun | G11C 15/00 365/49.1 |
| 2014/0082302 A1* | 3/2014 | Rommelmann | G03G 21/1889 711/E12.001 |
| 2014/0115571 A1* | 4/2014 | Wang | G06F 8/654 717/168 |
| 2014/0115666 A1* | 4/2014 | Garcia Morchon | H04L 9/3242 726/3 |
| 2014/0140342 A1 | 5/2014 | Narad | |
| 2014/0181232 A1 | 6/2014 | Manula et al. | |
| 2014/0181818 A1 | 6/2014 | Vincent et al. | |
| 2014/0204943 A1 | 7/2014 | Palmer | |
| 2014/0233568 A1 | 8/2014 | Dong | |
| 2014/0241358 A1 | 8/2014 | Bosshart et al. | |
| 2014/0241359 A1 | 8/2014 | Bosshart et al. | |
| 2014/0241361 A1 | 8/2014 | Bosshart et al. | |
| 2014/0241362 A1 | 8/2014 | Bosshart et al. | |
| 2014/0244966 A1 | 8/2014 | Bosshart et al. | |
| 2014/0269432 A1 | 9/2014 | Goyal et al. | |
| 2014/0301192 A1 | 10/2014 | Lee et al. | |
| 2014/0321473 A1 | 10/2014 | Chen et al. | |
| 2014/0321476 A1 | 10/2014 | Yu et al. | |
| 2014/0328180 A1 | 11/2014 | Kim et al. | |
| 2014/0328344 A1 | 11/2014 | Bosshart | |
| 2014/0334489 A1 | 11/2014 | Bosshart et al. | |
| 2015/0003259 A1 | 1/2015 | Gao | |
| 2015/0009796 A1 | 1/2015 | Koponen et al. | |
| 2015/0010000 A1 | 1/2015 | Zhang et al. | |
| 2015/0020060 A1* | 1/2015 | Bandakka | H04L 67/10 717/171 |
| 2015/0023147 A1 | 1/2015 | Lee et al. | |
| 2015/0043589 A1 | 2/2015 | Han et al. | |
| 2015/0081833 A1 | 3/2015 | Pettit et al. | |
| 2015/0092539 A1 | 4/2015 | Sivabalan et al. | |
| 2015/0109913 A1 | 4/2015 | Yamashita | |
| 2015/0110114 A1 | 4/2015 | Wohlgemuth et al. | |
| 2015/0121355 A1* | 4/2015 | Chang | G06F 8/654 717/168 |
| 2015/0131666 A1 | 5/2015 | Kang et al. | |
| 2015/0131667 A1* | 5/2015 | Ko | H04L 45/745 370/392 |
| 2015/0142932 A1 | 5/2015 | Hallivuori et al. | |
| 2015/0142991 A1* | 5/2015 | Zaloom | H04N 21/436 709/248 |
| 2015/0146527 A1* | 5/2015 | Kishore | H04L 47/115 370/230.1 |
| 2015/0156288 A1 | 6/2015 | Lu et al. | |
| 2015/0172198 A1 | 6/2015 | Levy et al. | |
| 2015/0178395 A1 | 6/2015 | Tiwari et al. | |
| 2015/0180769 A1 | 6/2015 | Wang et al. | |
| 2015/0194215 A1 | 7/2015 | Douglas et al. | |
| 2015/0195206 A1 | 7/2015 | Memon et al. | |
| 2015/0222560 A1 | 8/2015 | Kakadia et al. | |
| 2015/0249572 A1 | 9/2015 | Mack-Crane et al. | |
| 2015/0256465 A1 | 9/2015 | Mack-Crane et al. | |
| 2015/0271011 A1 | 9/2015 | Neginhal et al. | |
| 2015/0281125 A1 | 10/2015 | Koponen et al. | |
| 2015/0319086 A1 | 11/2015 | Tripathi et al. | |
| 2015/0358290 A1* | 12/2015 | Jain | G06F 9/45533 726/13 |
| 2015/0363522 A1 | 12/2015 | Maurya | |
| 2015/0381418 A1 | 12/2015 | Fausak et al. | |
| 2015/0381495 A1* | 12/2015 | Cherian | H04L 49/30 370/392 |
| 2016/0006654 A1 | 1/2016 | Fernando et al. | |
| 2016/0014073 A1 | 1/2016 | Reddy et al. | |
| 2016/0019161 A1 | 1/2016 | Patel et al. | |
| 2016/0094460 A1 | 3/2016 | Shelar et al. | |
| 2016/0112317 A1* | 4/2016 | Hood | H04L 41/0893 370/392 |
| 2016/0139892 A1 | 5/2016 | Atreya et al. | |

(56) References Cited

U.S. PATENT DOCUMENTS

| | | |
|---|---|---|
| 2016/0149784 A1 | 5/2016 | Zhang et al. |
| 2016/0156557 A1 | 6/2016 | Bosshart et al. |
| 2016/0173371 A1 | 6/2016 | Bays |
| 2016/0173383 A1 | 6/2016 | Liu et al. |
| 2016/0188313 A1* | 6/2016 | Dubal .............. G06F 8/65 717/172 |
| 2016/0188320 A1* | 6/2016 | Chang ............... G06F 8/66 717/168 |
| 2016/0191306 A1* | 6/2016 | Gasparakis .......... H04L 67/04 370/419 |
| 2016/0191361 A1 | 6/2016 | Behera et al. |
| 2016/0191370 A1 | 6/2016 | Wood |
| 2016/0191384 A1 | 6/2016 | Shelar et al. |
| 2016/0191406 A1 | 6/2016 | Xiao et al. |
| 2016/0191530 A1* | 6/2016 | Jain ................. H04L 45/74 726/4 |
| 2016/0197852 A1 | 7/2016 | Hutchison et al. |
| 2016/0212012 A1 | 7/2016 | Young et al. |
| 2016/0232019 A1* | 8/2016 | Shah ................ G06F 9/45558 |
| 2016/0234067 A1 | 8/2016 | Dolganow et al. |
| 2016/0234097 A1* | 8/2016 | Chang ............... H04L 45/54 |
| 2016/0234102 A1 | 8/2016 | Kotalwar et al. |
| 2016/0234103 A1* | 8/2016 | Kotalwar .......... H04L 47/2483 |
| 2016/0241459 A1 | 8/2016 | Zheng et al. |
| 2016/0301601 A1 | 10/2016 | Anand et al. |
| 2016/0315866 A1 | 10/2016 | Thapar et al. |
| 2016/0323243 A1 | 11/2016 | Levasseur et al. |
| 2016/0330127 A1 | 11/2016 | Kim et al. |
| 2016/0330128 A1 | 11/2016 | Wang |
| 2016/0337329 A1 | 11/2016 | Sood et al. |
| 2016/0342510 A1 | 11/2016 | Pani |
| 2016/0344629 A1 | 11/2016 | Gray |
| 2016/0357534 A1 | 12/2016 | Krishnamoorthi et al. |
| 2016/0359685 A1 | 12/2016 | Yadav et al. |
| 2017/0005951 A1 | 1/2017 | Labonte et al. |
| 2017/0013452 A1 | 1/2017 | Mentze et al. |
| 2017/0019302 A1 | 1/2017 | Lapiotis et al. |
| 2017/0019329 A1 | 1/2017 | Kozat et al. |
| 2017/0034082 A1 | 2/2017 | Pfaff |
| 2017/0041209 A1 | 2/2017 | Joshi et al. |
| 2017/0048144 A1 | 2/2017 | Liu |
| 2017/0053012 A1 | 2/2017 | Levy et al. |
| 2017/0063690 A1 | 3/2017 | Bosshart |
| 2017/0064047 A1 | 3/2017 | Bosshart |
| 2017/0070416 A1 | 3/2017 | Narayanan et al. |
| 2017/0075692 A1 | 3/2017 | Naresh et al. |
| 2017/0085414 A1 | 3/2017 | Castaldelli et al. |
| 2017/0085477 A1 | 3/2017 | Li et al. |
| 2017/0085479 A1 | 3/2017 | Wang et al. |
| 2017/0091258 A1 | 3/2017 | Rajahalme |
| 2017/0093707 A1 | 3/2017 | Kim et al. |
| 2017/0093986 A1 | 3/2017 | Kim et al. |
| 2017/0093987 A1 | 3/2017 | Kaushalram et al. |
| 2017/0111275 A1 | 4/2017 | Li et al. |
| 2017/0118041 A1 | 4/2017 | Bhattacharya et al. |
| 2017/0118042 A1 | 4/2017 | Bhattacharya et al. |
| 2017/0126588 A1 | 5/2017 | Anand et al. |
| 2017/0134282 A1 | 5/2017 | Agarwal et al. |
| 2017/0134310 A1 | 5/2017 | Koladi et al. |
| 2017/0142000 A1 | 5/2017 | Cai et al. |
| 2017/0142011 A1 | 5/2017 | Zhang et al. |
| 2017/0149632 A1 | 5/2017 | Saltsidis et al. |
| 2017/0180273 A1 | 6/2017 | Daly et al. |
| 2017/0195229 A1 | 7/2017 | Ulas et al. |
| 2017/0208015 A1 | 7/2017 | Volkening et al. |
| 2017/0220499 A1 | 8/2017 | Gray |
| 2017/0222881 A1 | 8/2017 | Holbrook et al. |
| 2017/0223575 A1 | 8/2017 | Duda et al. |
| 2017/0251077 A1 | 8/2017 | Eerpini et al. |
| 2017/0264571 A1 | 9/2017 | Aibester et al. |
| 2017/0289034 A1 | 10/2017 | Bosshart et al. |
| 2018/0006945 A1 | 1/2018 | Flajslik et al. |
| 2018/0006950 A1 | 1/2018 | Flajslik et al. |
| 2018/0054385 A1 | 2/2018 | Dharmapurikar et al. |
| 2018/0103060 A1 | 4/2018 | Li et al. |
| 2018/0115478 A1 | 4/2018 | Kim et al. |
| 2018/0124183 A1 | 5/2018 | Kozat et al. |
| 2018/0191640 A1 | 7/2018 | Calderon et al. |
| 2018/0234340 A1 | 8/2018 | Kim et al. |
| 2018/0234355 A1 | 8/2018 | Kim et al. |
| 2018/0262424 A1 | 9/2018 | Roeland et al. |
| 2018/0287819 A1 | 10/2018 | Mayer-Wolf et al. |
| 2018/0316549 A1* | 11/2018 | Gasparakis .......... H04L 67/34 |
| 2018/0375755 A1 | 12/2018 | Joshi et al. |
| 2019/0394086 A1* | 12/2019 | Gasparakis .......... H04L 67/04 |
| 2020/0007473 A1 | 1/2020 | Kim et al. |
| 2020/0021486 A1* | 1/2020 | Gasparakis .......... H04L 67/34 |
| 2020/0076737 A1 | 3/2020 | Bosshart |
| 2020/0084093 A1* | 3/2020 | Gasparakis .......... H04L 67/04 |
| 2020/0099617 A1 | 3/2020 | Bosshart |
| 2020/0099618 A1 | 3/2020 | Bosshart |
| 2020/0099619 A1 | 3/2020 | Bosshart |
| 2020/0228433 A1 | 7/2020 | Lee |
| 2020/0244576 A1 | 7/2020 | Wetterwald et al. |
| 2020/0267098 A1* | 8/2020 | Galles ............... H04L 47/263 |
| 2020/0280428 A1 | 9/2020 | Kovacs et al. |
| 2020/0280518 A1 | 9/2020 | Lee et al. |
| 2022/0321404 A1* | 10/2022 | Gasparakis .......... H04L 41/342 |
| 2023/0231818 A1* | 7/2023 | Galles ............. H04L 49/3018 370/415 |
| 2024/0080276 A1* | 3/2024 | Agrawal ........... H04L 49/3063 |

FOREIGN PATENT DOCUMENTS

| | | |
|---|---|---|
| CN | 101305561 | 11/2008 |
| CN | 101352012 | 1/2009 |
| CN | 101453673 | 6/2009 |
| CN | 103248573 | 8/2013 |
| CN | 104067231 | 9/2014 |
| CN | 104205080 | 12/2014 |
| CN | 104205753 | 12/2014 |
| CN | 105052113 | 11/2015 |
| EP | 3229424 | 10/2017 |
| JP | 2015080175 | 4/2015 |
| JP | 6127900 | 5/2017 |
| WO | 2013101024 | 7/2013 |
| WO | 2016063189 | 4/2016 |
| WO | 2017112165 | 6/2017 |

OTHER PUBLICATIONS

Advisory Action for U.S. Appl. No. 15/888,054, dated Feb. 10, 2020.
Final Office Action for U.S. Appl. No. 15/784,191, dated Feb. 26, 2021.
Final Office Action for U.S. Appl. No. 15/784,191, dated May 7, 2020, 13 pages.
Final Office Action for U.S. Appl. No. 15/784,192, dated Jun. 1, 2020, 14 pages.
Final Office Action for U.S. Appl. No. 15/888,050, dated Dec. 12, 2019.
Final Office Action for U.S. Appl. No. 15/888,054, dated Sep. 18, 2019.
Final Office Action for U.S. Appl. No. 16/695,044, dated Dec. 20, 2021.
Final Office Action for U.S. Appl. No. 16/804,960, dated Apr. 14, 2022.
International Preliminary Report on Patentability for PCT Application No. PCT/US2016/062511, dated Jun. 26, 2018.
International Search Report and Written Opinion for PCT Application No. PCT/US2016/062511, dated Feb. 28, 2017.
Non-Final Office Action for U.S. Appl. No. 16/569,554, dated Feb. 19, 2021.
Notice of Allowance for Chinese Patent Application No. 201680075637.4, dated Apr. 1, 2022.
Notice of Allowance for U.S. Appl. No. 14/583,664, dated Feb. 28, 2018.
Notice of Allowance for U.S. Appl. No. 14/836,850, dated Jun. 20, 2017.
Notice of Allowance for U.S. Appl. No. 14/836,855, dated Jun. 30, 2017.

(56) References Cited

OTHER PUBLICATIONS

Notice of Allowance for U.S. Appl. No. 14/977,810, dated Oct. 20, 2017.
Notice of Allowance for U.S. Appl. No. 15/678,549, dated Apr. 8, 2020.
Notice of Allowance for U.S. Appl. No. 15/678,549, dated Dec. 27, 2019.
Notice of Allowance for U.S. Appl. No. 15/678,556, dated Feb. 4, 2020.
Notice of Allowance for U.S. Appl. No. 15/729,555, dated May 2, 2019.
Notice of Allowance for U.S. Appl. No. 15/729,593, dated Nov. 15, 2018.
Notice of Allowance for U.S. Appl. No. 15/784,190, dated May 10, 2019, 20 pages.
Notice of Allowance for U.S. Appl. No. 15/784, 191, dated Apr. 19, 2019, 7 pages.
Notice of Allowance for U.S. Appl. No. 15/784,191, dated Aug. 21, 2019, 8 pages.
Notice of Allowance for U.S. Appl. No. 15/784,191, dated Aug. 31, 2021.
Notice of Allowance for U.S. Appl. No. 15/784,191, dated May 5, 2021.
Notice of Allowance for U.S. Appl. No. 15/784,192, dated Mar. 17, 2021.
Notice of Allowance for U.S. Appl. No. 15/784,192, dated Jun. 30, 2021.
Notice of Allowance for U.S. Appl. No. 15/784,192, dated Sep. 30, 2021.
Notice of Allowance for U.S. Appl. No. 15/835,233, dated Jul. 3, 2019, 8 pages.
Notice of Allowance for U.S. Appl. No. 15/835,233, dated Oct. 29, 2019.
Notice of Allowance for U.S. Appl. No. 15/835,235, dated Apr. 24, 2020.
Notice of Allowance for U.S. Appl. No. 15/835,235, dated Aug. 20, 2019, 16 pages.
Notice of Allowance for U.S. Appl. No. 15/835,238, dated Sep. 30, 2020.
Notice of Allowance for U.S. Appl. No. 15/835,239, dated Nov. 13, 2019, 10 pages.
Notice of Allowance for U.S. Appl. No. 15/835,242, dated Jun. 24, 2020.
Notice of Allowance for U.S. Appl. No. 15/835,242, dated Jul. 1, 2019, 7 pages.
Notice of Allowance for U.S. Appl. No. 15/835,247 dated Dec. 29, 2021.
Notice of Allowance for U.S. Appl. No. 15/835,247, dated Apr. 7, 2022.
Notice of Allowance for U.S. Appl. No. 15/835,249, dated Jul. 25, 2019.
Notice of Allowance for U.S. Appl. No. 15/835,250, dated Jul. 25, 2019, 17 pages.
Notice of Allowance for U.S. Appl. No. 15/878,966, dated May 15, 2019.
Notice of Allowance for U.S. Appl. No. 16/026,318, dated Mar. 12, 2019.
Notice of Allowance for U.S. Appl. No. 16/460,798, dated May 27, 2021.
Notice of Allowance for U.S. Appl. No. 16/519,873, dated Aug. 30, 2021.
Notice of Allowance for U.S. Appl. No. 16/519,873, dated Dec. 3, 2021.
Notice of Allowance for U.S. Appl. No. 16/519,873, dated Mar. 17, 2022.
Notice of Allowance for U.S. Appl. No. 16/573,847, dated Apr. 14, 2022.
Notice of Allowance for U.S. Appl. No. 16/573,847, dated Dec. 15, 2021.
Notice of Allowance for U.S. Appl. No. 16/582,798 U.S. Appl. No. 16/582,798, dated Aug. 27, 2021.
Notice of Allowance for U.S. Appl. No. 16/582,798, dated Dec. 1, 2021.
Notice of Allowance for U.S. Appl. No. 16/582,798, dated Mar. 22, 2022.
Notice of Allowance for U.S. Appl. No. 16/687,271, dated Aug. 30, 2021.
Notice of Allowance for U.S. Appl. No. 16/687,271, dated Dec. 1, 2021.
Notice of Allowance for U.S. Appl. No. 16/687,271, dated Mar. 22, 2022.
Notice of Allowance for U.S. Appl. No. 16/695,044 dated Apr. 27, 2022.
Notice of Allowance for U.S. Appl. No. 16/695,049, dated Apr. 28, 2022.
Notice of Allowance for U.S. Appl. No. 16/695,049, dated Jan. 5, 2022.
Notice of Allowance for U.S. Appl. No. 16/789,339, dated Jul. 29, 2021.
Notice of Allowance for U.S. Appl. No. 16/879,704, dated Apr. 26, 2022.
Notice of Allowance for U.S. Appl. No. 17/318,890, dated Jun. 8, 2022.
Notice of Allowance for U.S. Appl. No. 17/318,890, dated Mar. 3, 2022.
Office Action for Chinese Patent Application No. 201680075637.4, dated Mar. 2, 2021.
Office Action for Chinese Patent Application No. 201680075637.4, dated Sep. 23, 2021.
Office Action for U.S. Appl. No. 15/878,966, dated Jan. 11, 2019.
Office Action for U.S. Appl. No. 14/583,664, dated Feb. 27, 2017.
Office Action for U.S. Appl. No. 14/583,664, dated Jul. 28, 2016.
Office Action for U.S. Appl. No. 14/583,664, dated Oct. 18, 2017.
Office Action for U.S. Appl. No. 14/863,961, dated Jun. 16, 2017.
Office Action for U.S. Appl. No. 14/864,032, dated Feb. 14, 2017.
Office Action for U.S. Appl. No. 14/977,810, dated Jun. 29, 2017.
Office Action for U.S. Appl. No. 15/678,549, dated Feb. 26, 2019.
Office Action for U.S. Appl. No. 15/678,549, dated Jul. 30, 2019.
Office Action for U.S. Appl. No. 15/678,556, dated Jun. 19, 2019.
Office Action for U.S. Appl. No. 15/678,565, dated Jun. 13, 2019.
Office Action for U.S. Appl. No. 15/729,593, dated Aug. 10, 2018.
Office Action for U.S. Appl. No. 15/784,191, dated Aug. 26, 2020, 14 pages.
Office Action for U.S. Appl. No. 15/784,191, dated Dec. 19, 2018, 11 pages.
Office Action for U.S. Appl. No. 15/784,191, dated Jan. 24, 2020, 12 pages.
Office Action for U.S. Appl. No. 15/784,192, dated Sep. 19, 2019, 14 pages.
Office Action for U.S. Appl. No. 15/835,233, dated Feb. 8, 2019, 17 pages.
Office Action for U.S. Appl. No. 15/835,235, dated Feb. 25, 2019, 24 pages.
Office Action for U.S. Appl. No. 15/835,238, dated Dec. 11, 2019.
Office Action for U.S. Appl. No. 15/835,238, dated Feb. 7, 2019.
Office Action for U.S. Appl. No. 15/835,238, dated Jun. 19, 2019.
Office Action for U.S. Appl. No. 15/835,238, dated Jun. 5, 2020.
Office Action for U.S. Appl. No. 15/835,239, dated Feb. 7, 2019, 20 pages.
Office Action for U.S. Appl. No. 15/835,239, dated Jun. 19, 2019, 18 pages.
Office Action for U.S. Appl. No. 15/835,242, dated Oct. 18, 2019, 8 pages.
Office Action for U.S. Appl. No. 15/835,247, dated Dec. 31, 2018, 18 pages.
Office Action for U.S. Appl. No. 15/835,247, dated Jul. 10, 2019.
Office Action for U.S. Appl. No. 15/835,249, dated Dec. 31, 2018.
Office Action for U.S. Appl. No. 15/835,250, dated Apr. 4, 2019, 16 pages.
Office Action for U.S. Appl. No. 15/888,050, dated Jun. 11, 2019.
Office Action for U.S. Appl. No. 15/888,054, dated Mar. 11, 2019.
Office Action for U.S. Appl. No. 16/026,318, dated Sep. 20, 2018.

(56) References Cited

OTHER PUBLICATIONS

Office Action for U.S. Appl. No. 16/288,074, dated Oct. 7, 2020.
Office Action for U.S. Appl. No. 16/288,074, dated Mar. 5, 2020.
Office Action for U.S. Appl. No. 16/4670,798, dated Nov. 18, 2020.
Office Action for U.S. Appl. No. 16/519,873, dated Jun. 11, 2021.
Office Action for U.S. Appl. No. 16/569,554, dated Aug. 18, 2020.
Office Action for U.S. Appl. No. 16/569,554, dated Jul. 2, 2021.
Office Action for U.S. Appl. No. 16/569,554, dated Mar. 14, 2022.
Office Action for U.S. Appl. No. 16/569,554, dated Sep. 27, 2021.
Office Action for U.S. Appl. No. 16/573,847 dated Jan. 6, 2021.
Office Action for U.S. Appl. No. 16/573,847, dated Aug. 2, 2021.
Office Action for U.S. Appl. No. 16/582,798, dated Jun. 24, 2021.
Office Action for U.S. Appl. No. 16/687,271, dated Jun. 24, 2021.
Office Action for U.S. Appl. No. 16/695,044, dated Jul. 8, 2021.
Office Action for U.S. Appl. No. 16/695,049, dated Jul. 21, 2021.
Office Action for U.S. Appl. No. 16/695,053 dated Aug. 4, 2021.
Office Action for U.S. Appl. No. 16/695,053 dated Jan. 5, 2022.
Office Action for U.S. Appl. No. 16/695,053, dated May 11, 2022.
Office Action for U.S. Appl. No. 16/804,960, dated Aug. 19, 2021.
Office Action for U.S. Appl. No. 16/804,960, dated Dec. 13, 2021.
Office Action for U.S. Appl. No. 16/804,960, dated May 12, 2021.
Office Action in Chinese Patent Application No. 201680075637.4, dated Jan. 5, 2022.
"Selection of Cyclic Redundancy Code and Checksum Algorithms to Ensure Critical Data Integrity", Federal Aviation Administration William J. Hughes Technical Center Aviation Research Division Atlantic City International Airport New Jersey 08405, DOT/FAA/TC-14/49, Mar. 2015, 111 pages.
Arashloo, Mina Tahmasbi, et al., "SNAP: Stateful Network-Wide Abstractions for Packet Processing", SIGCOMM '16, Aug. 22-26, 2016, 27 pages, ACM, Florianopolis, Brazil.
Bosshart, P., et al., "Forwarding Metamorphosis: Fast Programmable Match-Action Processing in Hardware or SDN", SIGCOMM'13, Aug. 12-16, 2013, 12 pages, ACM, Hong Kong, China.
Kaufmann, A., et al., "High Performance Packet Processing with FlexNIC", ASPLOS'16, Apr. 2-6, 2016, 15 pages, ACM, Atlanta, GA, USA.
Moshref, Masoud, et al., "Flow-level State Transition as a New Switch Primitive for SON", HotSDN'14, Aug. 22, 2014, 6 pages, ACM, Chicago, IL, USA.
Sivaraman, A., et al., "Towards Programmable Packet Scheduling", HotNets'15, Nov. 16-17, 2015, 7 pages, ACM, Philadelphia, PA, USA.
Sivaraman, Anirudh, et al., "Packet Transactions: A Programming Model for Data-Plane Algorithms at Hardware Speed", arXiv:1512.05023v1, Dec. 16, 2015, 22 pages.
Sivaraman, Anirudh, et al., "Packet Transactions: High-level Programming for Line-Rate Switches", ?rXiv:1512.05023v2, Jan. 30, 2016, 16 pages.
Sivaraman, Anirudh, et al., "Packet Transactions: High-level Programming for Line-Rate Switches", SIGCOMM'16, Aug. 22-26, 2016, 14 pages, ACM, Florianopolis, Brazil.
Sivaraman, Anirudh, et al., "Programmable Packet Scheduling at Line Rate" SIGCOMM'16, Aug. 22-26, 2016, 14 pages, ACM, Florianopolis, Brazil.
Song, "Protocol-Oblivious Forwarding: Unleashe the Power of SDN through a Future-Proof Forwarding Plane", Huawei Technologies, USA, 6 pages.
Office Action for U.S. Appl. No. 17/134,110, dated Jun. 24, 2022.
Final Office Action for U.S. Appl. No. 17/134,110 dated Oct. 25, 2022.
Notice of Allowance for U.S. Appl. No. 17/867,508, dated Nov. 14, 2022.
Office Action for U.S. Appl. No. 17/134,110, dated Dec. 22, 2022.
Office Action for U.S. Appl. No. 17/484,004, dated Oct. 27, 2022.
Office Action for U.S. Appl. No. 17/859,722, dated Oct. 26, 2022.
Notice of Allowance for U.S. Appl. No. 15/835,247, dated Jul. 29, 2022.
Office Action for U.S. Appl. No. 16/695,053, dated Oct. 14, 2022.
Notice of Allowance for U.S. Appl. No. 17/484,004, dated Feb. 15, 2023.
Notice of Allowance for U.S. Appl. No. 17/494,515, dated Feb. 28, 2023.
Notice of Allowance from U.S. Appl. No. 17/134,110 dated Apr. 26, 2023, 9 pgs.
Office Action for U.S. Appl. No. 17/859,722, dated Mar. 28, 2023.
Notice of Allowance from U.S. Appl. No. 17/859,722 notified Aug. 9, 2023, 9 pgs.
Notice of Allowance from U.S. Appl. No. 18/077,543 notified Aug. 23, 2023, 16 pgs.
Office Action from Chinese Patent Application No. 202111494631.X notified Jul. 18, 2023, 18 pgs.
Non-Final Office Action from U.S. Appl. No. 18/130,733 notified Oct. 26, 2023, 13 pgs.
Notice of Allowance from Chinese Patent Application No. 202111494631.X notified Jan. 2, 2024, 4 pgs.
Notice of Allowance from U.S. Appl. No. 17/859,722 notified Dec. 12, 2023, 16 pgs.
Notice of Allowance from U.S. Appl. No. 18/077,543 notified Dec. 15, 2023, 17 pgs.
Office Action from Chinese Patent Application No. 202111206815.1 notified Oct. 19, 2023, 14 pgs.
Office Action from Chinese Patent Application No. 202111494631.X notified Oct. 20, 2023, 5 pgs.
"In-band Network Telemetry (INT)", The P4.org Applications Working Group, Contributions from: Alibaba, Arista, Barefoot Networks, Dell, Intel, VMware. Dec. 11, 2017, 29 pgs.
"Intel Tofino 6.4 Tbps, 4 pipelines", Intel, 3 pgs.
"P416 Language Specification Version 1.0.0", The P2 Language Consortium, Jul. 22, 2017, 129 pgs.
"P416 Language Specification Version 1.1.0", The P4 Language Consortium, Nov. 20, 2018, 147 pgs.
"The P4 Language Specification Version 1.0.2", The P4 Language Consortium, Mar. 3, 2015, 90 pgs.
"The P4 Language Specification Version 1.0.4", The P4 Language Consortium, May 24, 2017, 97 pgs.
"The P4 Language Specification Version 1.0.5", The P4 Language Consortium, Nov. 26, 2018, 96 pgs.
"The P4 Language Specification Version 1.1.0", The P4 Language Consortium, Jan. 27, 2016, 124 pgs.
"The P4 Language Specification, Version 1.0.3", The P4 Language Consortium, Nov. 2, 2016, 97 pgs.
"The Walls Come Down On the Last Bastion of Proprietary", The Next Platform, Jun. 14, 2016, 13 pgs.
"Tofino 2.0 Tbps, 2 pipelines", Intel, 3 pgs.
"Tofino 3.2 Tbps, 2 pipelines", Intel, 3 pgs.
"Tofino 3.2 Tbps, 4 pipelines", Intel, 3 pgs.
"Tofino(TM)-based Wedge 100B Switch Designs with the Open Compute Project (OCP)", Barefoot Networks, Jan. 23, 2017. 7 pgs.
Bosshart, et al., "Forwarding Metamorphosis: Fast Programmable Match-Action Processing in Hardware for SDN (Extended Version)", Chip Techreport, 2013, 16 pgs.
Bosshart, et al., "P4: Programming Protocol-Independent Packet Processors", ACM SIGCOMM Computer Communication Review, vol. 44, No. 3. Jul. 2014, 8 pgs.
Gurevich, "Programmable Data Plane at Terabit Speeds", Barefoot Networks, May 16, 2017, 45 pgs.
Kfoury, et al., "An Exhaustive Survey on P4 Programmable Data Plane Switches: Taxonomy, Applications, Challenges, and Future Trends", IEEE, vol. 14, 2016, 64 pgs.
Non-Final Office Action from U.S. Appl. No. 18/214,665 notified Feb. 1, 2024, 9 pgs.
Notice of Allowance from Chinese Patent Application No. 202111206815.1 notified Mar. 19, 2024, 6 pgs.
Notice of Allowance from U.S. Appl. No. 17/859,722 notified Mar. 20, 2024, 13 pgs.
Notice of Allowance from U.S. Appl. No. 18/077,543 notified Apr. 8, 2024, 13 pgs.
Notice of Allowance from U.S. Appl. No. 18/130,733 notified May 16, 2024, 13 pgs.
Notice of Allowance from U.S. Appl. No. 18/130,733 notified Feb. 7, 2024, 14 pgs.

(56) References Cited

OTHER PUBLICATIONS

Notice of Allowance from U.S. Appl. No. 18/214,665 notified May 8, 2024, 43 pgs.

* cited by examiner

PROGRAMMABLE PROTOCOL PARSER FOR NIC CLASSIFICATION AND QUEUE ASSIGNMENTS

CROSS-REFERENCE TO RELATED APPLICATION

This application is a continuation application of U.S. application Ser. No. 16/026,318, entitled "PROGRAMMABLE PROTOCOL PARSER FOR NIC CLASSIFICATION AND QUEUE ASSIGNMENTS," which was filed on Jul. 3, 2018 and which is a application is a divisional application of U.S. application Ser. No. 14/583,664, entitled "PROGRAMMABLE PROTOCOL PARSER FOR NIC CLASSIFICATION AND QUEUE ASSIGNMENTS," which was filed on Dec. 27, 2014.

BACKGROUND

Modern computing devices have become ubiquitous tools for personal, business, and social uses. As such, many modern computing devices are capable of connecting to various data networks, including the Internet and corporate intranets, to retrieve and receive data communications over such networks. Oftentimes, a computing device connected to one network needs to communicate with a computing device connected on a different network.

A networking device, such as a network interface controller (NIC) (also known as a network interface card, network adapter, LAN adapter, and by similar terms) is a computer hardware component that connects a computer to a computer network. A NIC implements the electronic circuitry required to communicate using a specific physical layer and data link layer standard such as Ethernet, Wi-Fi or Token Ring. This provides a base for a full network protocol stack, allowing communication among small groups of computers on the same LAN and large-scale network communications through routable protocols, such as IP.

Current NICs classify packets and assign actions based on pre-defined, fixed packet types and/or offsets that are typically embodied in microcode that is flashed onto the NIC. Standard NIC architecture does not allow a user to efficiently define new protocols, packet types, and/or queue assignments to accommodate new or updated target applications. Such capabilities may be useful in a computing user experience (UX), particularly, but not exclusively, in software defined networking (SDN).

SDN is a networking architecture in which decisions regarding how network traffic is to be processed and the devices or components that actually process the network traffic are decoupled into separate planes (i.e., the control plane and the data plane). In SDN environments, a centralized SDN controller may be used to make forwarding decisions for network traffic instead of a network device such as, for example, a network switch. Typically, forwarding decisions are communicated to a network device operating in the SDN environment, which in turn forwards network packets associated with the network traffic to the next destination based on the forwarding decisions made by the SDN controller.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
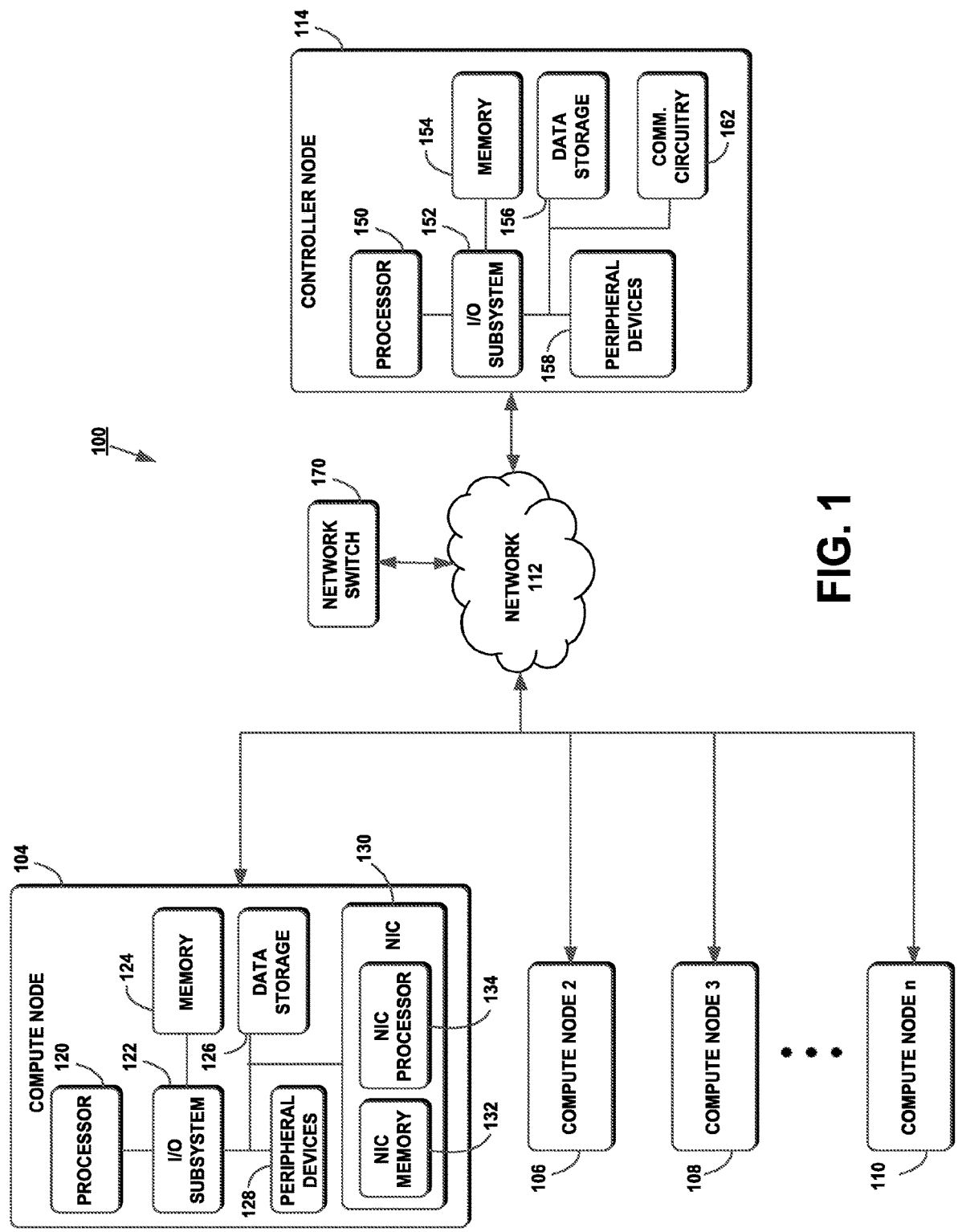
FIG. 1 is a simplified block diagram of at least one embodiment of a system for managing network packet flow.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative embodiment of system 100 for managing network packet flow includes a controller node 114 communicatively coupled to a plurality of compute nodes (104-110) via a network 112. In use, the system 100 of FIG. 1, as well as other embodiments disclosed herein, provides various functionalities relating packet forwarding, routing, filtering, etc. that may be accomplished on a local (NIC) level as opposed to a network switch level. As such, a controller and/or its north bound APIs can be configured to fully define a protocol. As discussed in more detail below, each compute node 104-110 include an associated NIC, or other networking device, which include a parser and a compiler to facilitate updating of control functions of the associated NIC (or other networking device). The parser may be programmed in substantially real-time or "on-the-fly" (e.g., while data traffic and/or packet flow is occurring) based on structured programmable parsing approaches that allow a user to define both protocol descriptors and a parse graph. Utilizing the disclosed parser in the NIC advantageously provides a better offload engine (e.g., in terms of dropping ACLs or pushing/popping tags based on on-the fly customized protocols) and a way to make packet processing more efficient in the host (e.g., by forwarding packets of a specific flow on the same PCIe bus as the consuming application or VM so there is no cross-QPI traffic). As such, the parser has the ability to understand optional tags and headers and filter accordingly. The compiler of the NIC (or other networking device) may be configured as a just-in-time compiler that uses a protocol specification language representation of a parse graph to create the required hardware updates to support the parse graph. The compiler may generate microcode, persistent instructions such as firmware updates, register writes, and so forth.

In the embodiment illustrated in FIG. 1, the compute node 104 (as well as the compute nodes 106-110) may be embodied as any type of computing device capable of performing the functions described herein. For example, the compute node 104 may be embodied as, but is not limited to, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, and/or any other computing device configured to store and access data, and to execute electronic cloud software and related applications. Compute nodes 2-$n$ (106-110) are similarly configured to the arrangement illustrated in compute node 104.

In the illustrative embodiment of FIG. 1, the compute node 104 includes a processor 120, an I/O subsystem 122, a memory 124, a data storage 126, communication circuitry comprising a NIC 130, and one or more peripheral devices 128. As can be seen in the illustrative figure, the NIC 130 may be equipped with its own memory 132 and a processor 134 for processing and updating protocol sequences and protocol parsing. Of course, the compute node 104 may include other or additional components, such as those commonly found in a digital apparatus and/or computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), a single or multi-socket processor(s), digital signal processor, microcontroller, or other processor or processing/controlling circuit. Similarly, the memory 124 may be embodied as any type of volatile or non-volatile memory or data storage currently known or developed in the future and capable of performing the functions described herein. In operation, the memory 124 may store various data and software used during operation of the compute node 104 such as operating systems, applications, programs, libraries, and drivers.

The memory 124 may be communicatively coupled to the processor 120 via the I/O subsystem 122, which may be embodied as circuitry and/or components to facilitate input/output operations with the processor 120, the memory 124, and other components of the compute node 104. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the compute node 104, on a single integrated circuit chip.

The NIC 130 of the compute node 104 may be embodied as any number of devices and/or circuitry for enabling communications between the compute node 104 and one or more other external electronic devices and/or systems and performing the functions described herein. Similarly, the peripheral devices 128 may be embodied as any number of additional input/output devices, interface devices, and/or other peripheral devices. The peripheral devices 128 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

In some embodiments, the memory 124 and/or the data storage 126 has stored therein one or more application programs, and the processor 120 is operable to execute the one or more application programs and control a display screen to display corresponding graphical information thereon. In some embodiments, the system 100 may include a controller node 114 configured to store and/or execute the one or more application programs, and in such embodiments the compute node 104 may operate as a thin-client device. Although only one such controller node 114 is shown in FIG. 1, it should be appreciated that, in other embodiments, system 100 may include any number of controller nodes.

The controller node 114 may be embodied as any type of server (e.g., a SDN server, web server, etc.) or similar computing device capable of performing the functions described herein. In the illustrative embodiment of FIG. 1, the controller node 114 includes a processor 150, an I/O subsystem 152, a memory 154, a data storage 156, a communication circuitry 162, and one or more peripheral devices 158. Components of the controller node 114 may be similar to the corresponding components of the compute node 104, the description of which is applicable to the corresponding components of the controller node 114 and is not repeated herein for clarity of the description.

In the illustrative embodiment, communication between compute nodes 104-110 and the controller node 114 takes place via the network 112, which may be operatively coupled to one or more network switches 170. In an embodiment, the network 112 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry of compute node 104 (e.g., NIC 130) and the communication circuitry 162 of controller node 114 may be configured to use any one or more, or combination, of communication protocols to communicate with each other such as, for example, a wired network communication protocol (e.g., TCP/IP), a wireless network communication protocol (e.g., Wi-Fi®, WiMAX), a cellular communication protocol (e.g., Wideband Code Division Multiple Access (W-CDMA)), and/or other communication protocols. As such, the network 112 may include any number of additional devices, such as additional computers, routers, and switches, to facilitate communications between compute node 104 and controller node 114.

Under various embodiments described in further detail below, the controller node 114 may be configured to provide updates to a NIC 130 located in any of compute nodes 104-110. In a SDN application, software, such as a remote controller, can define protocols at controller node 114 using a protocol definition language at runtime. The controller node 114 can generate a parse graph and device-specific microcode for transmission to compute node 104 to allow controller node 114 to compile the information and update the operation of the NIC 130. In another embodiment, the controller node 114 can generate a parse graph and register parameters for transmission to the compute node 104 to allow the controller node 114 to update the NIC 130 operation. In a server administration application, a system administration tool can define protocols at the controller node 114 using a protocol definition language at runtime. Similar to the SDN application, the controller node 114 can generate a parse graph and device-specific microcode for transmission and compiling in the compute node 104 to allow controller node to update the operation of the NIC 130. Also, controller node 114 can generate a parse graph and register parameters for transmission to compute node 104 to allow the controller node 114 to update operation of the NIC 130.

Such configurations can advantageously provide improved control over NIC functionality such as classification and queue assignment, which may affect server performance in a datacenter. Additionally, the configurations provide a mechanism to enable NIC actions, such as rate limitation, access control lists (ACLs) and the like, according to user-defined protocols. In various embodiments described herein, NICs are configured to register or "learn" new protocols "on the fly," meaning that no reset is required (i.e., no reset of the NIC, no reset the networking device, and/or not reset of particular sub-components of the NIC or networking device). Once the new protocols are registered on the NIC 130, the controller node 114 can push actions and/or filters to the NIC 130 to perform new functions for the defined protocols (e.g., classification, queue assignment). This in turn provides better granularity and flexibility in terms of how packets are classified, filtered, and assigned to queues by providing users an interface for defining protocols, packet types and derived classification actions.

While embodiments described below are illustrated in the context of a SDN, it should be appreciated by those skilled in the art that the techniques described herein may be applicable to other networking protocols and/or architectures. In certain embodiments, the system 100 may be based generally on a modified OpenFlow communications protocol. The OpenFlow protocol may provide access to a forwarding plane of a network switch (e.g., 170) or router over network 112. This enables remote controllers, such as controller node 114, to determine a path of network packets through a network of switches (e.g., 170). The separation of the control from the forwarding allows for more flexible and/or sophisticated traffic management.

Furthermore, OpenFlow allows switches from different suppliers, often comprising their own proprietary interfaces and scripting languages, to be managed remotely using a single, open protocol. OpenFlow further allows remote administration of a switch's packet forwarding tables, by adding, modifying and removing packet matching rules and actions. This way, routing decisions can be made periodically or ad hoc by the controller and translated into rules and actions with a configurable lifespan, which are then deployed to a switch's flow table, leaving the actual forwarding of matched packets to the switch at wire speed for the duration of those rules. Packets that are unmatched by a switch can be forwarded to controller node 114. Controller node 114 can then decide to modify existing flow table rules on one or more switches or to deploy new rules, to prevent a structural flow of traffic between switch and controller. It could even decide to forward the traffic itself, provided that it has informed the switch to forward entire packets instead of just their header.

Figure 2:
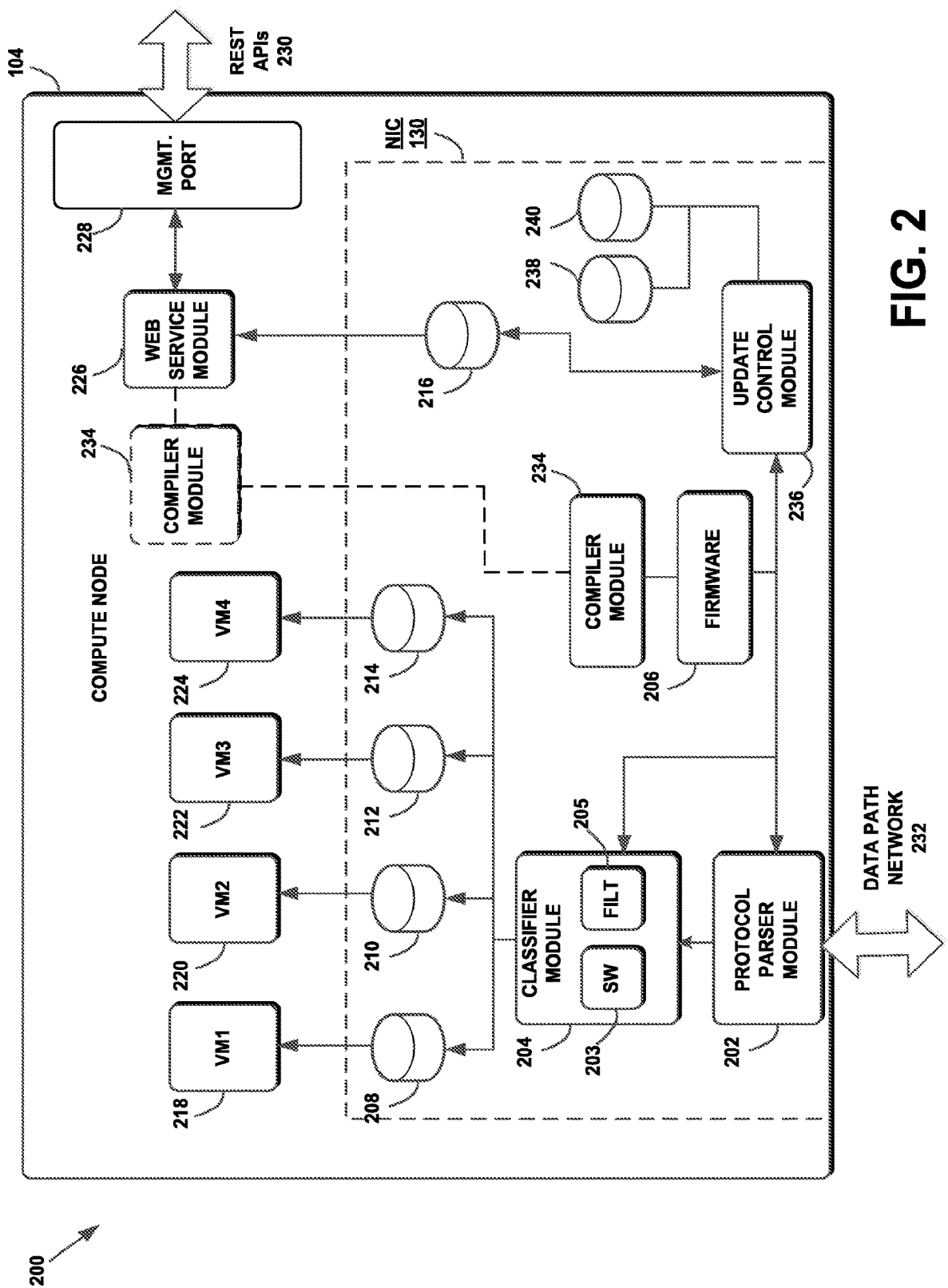
FIG. 2 is a simplified block diagram of at least one embodiment of an environment of a compute node of the system FIG. 1.

Referring now to FIG. 2, in use, each compute node 104 may establish an environment 200 during operation. In the illustrative embodiment, the environment 200 comprises the NIC 130, which includes persistent instructions (e.g., firmware) 206 for providing control program(s) for NIC 130. The persistent instructions 206 may be stored in, for example, the memory 132 of the NIC 130. The NIC 130 also includes a compiler module 234 and an update control module 236 as shown, wherein the update control module 236 may be operatively coupled to a classifier rules database 238 and a protocol descriptor database 240. The update control module 236 may further comprise persistent instructions (e.g., firmware) and driver interfaces to provide data transfer to/from the NIC 130 outside the confines of low-level code and code updates. In one embodiment, updates received via the NIC 130 are programmed in the appropriate specification language for the particular NIC model and loaded into the driver to avoid the need for having the user interact on an assembly language level. In other exemplary embodiments, the compiler module 234 may be configured as part of the web service module 226 as shown in FIG. 2. Under this configuration, the web service 226 receives and compiles a parse graph (using compiler 234 shown in dotted lines) and pushes it to the NIC 130.

The persistent instructions (e.g., firmware) 206 and related components may be embodied in non-volatile memory (e.g., ROM, EPROM, flash memory). The persistent instructions (e.g., firmware) 206 is operatively coupled to the administrative queue 216 (AQ) via update the control module 236, where the administrative queue 216 may be used for communications to store system-generated acknowledgement messages that message queuing or connector applications create. The administrative queue 216 may be embodied as any type of data storage capable of storing messages such as a portion of a memory. The administrative queue 216 may be coupled to web service module 226, which connects to the management port 228 configured to receive and communicate data such as representational state transfer application programming interfaces (REST API) 230 from controller node 114.

Update control module 236 is also operatively coupled to a programmable protocol parser module 202, which may also receive data from data path network 232. In this example, the protocol parser module 202 handles processing and communication of protocol descriptors and is configured with a protocol field extractor and packet type identifier. The classifier module 204 contains a set of rules that may be ordered by priority (e.g., n-tuple classification) to find matching rules for each incoming packet. Classifier module 204 is configured to process flow tables for packets using a classifier switch 203 and filters 205. In the illustrative embodiment, various rules and flow tables may be enabled in the classifier module 204 according to characteristics such as source IP, destination IP, source port, destination port, protocol (e.g., TCP, UDP), and assigned an action (e.g., permit, deny). Internal flow of data in the compute node 104 from the classifier module 204 may be directed through a plurality of queues (208-214) associated with respective virtual machines (VM1-VM4; 218-224) or other suitable modules. The update control module 236 may provide switch rules for classification to classifier module 204 and protocol descriptors to protocol parser module 202 for processing.

The various modules of the environment 200 may be embodied as hardware, firmware, software, or a combination thereof. For example the various modules, logic, and other components of the environment 200 may form a portion of, or otherwise be established by, the NIC 130, the processor 120, or other hardware components of the compute node 104. As such, in some embodiments, any one or more of the modules of the environment 200 may be embodied as a circuit or collection of electrical devices (e.g., an update control circuit and/or a classifier circuit).

Figure 3:
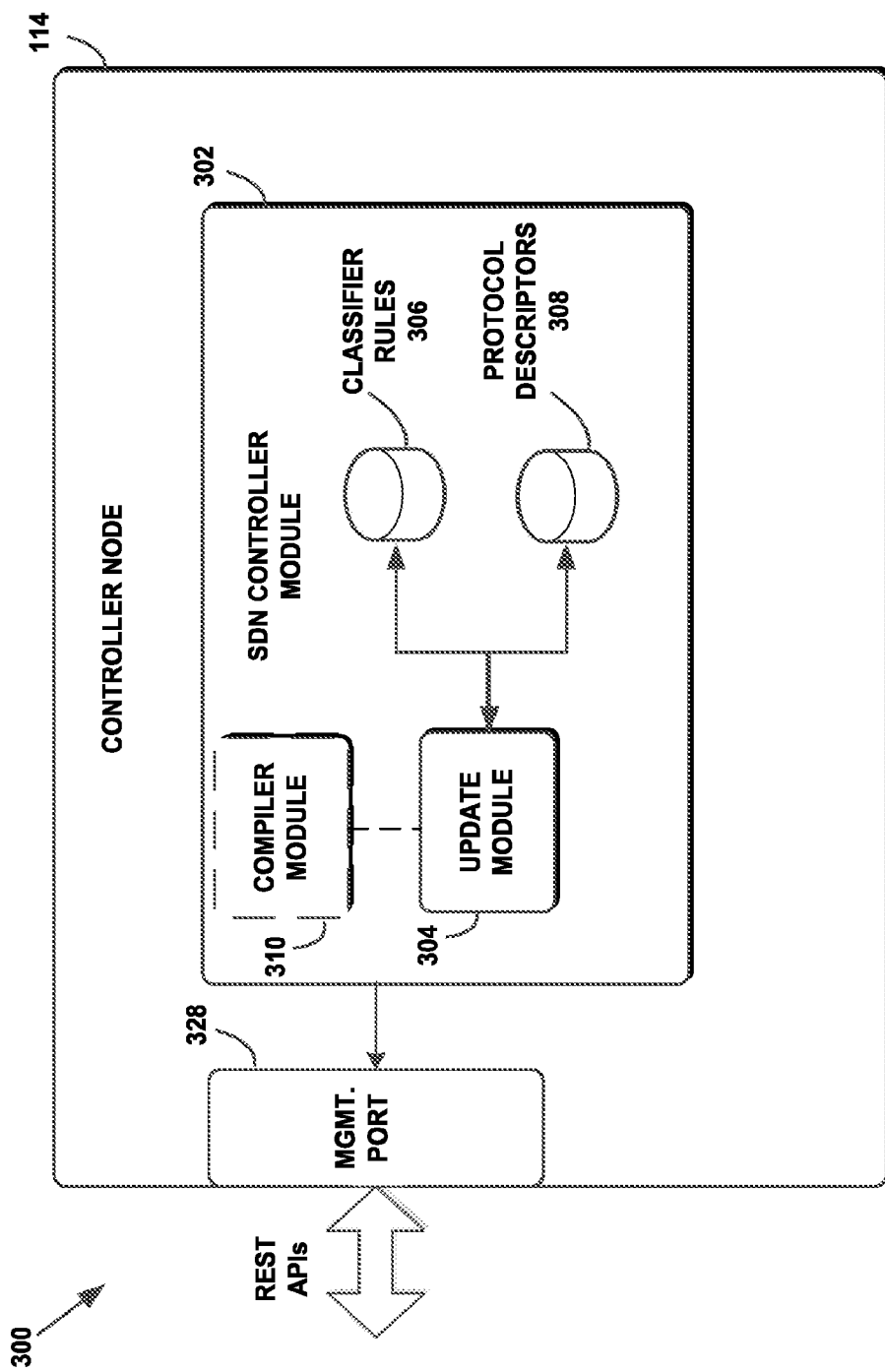
FIG. 3 is a simplified block diagram of at least one embodiment of an environment of a controller node of the system of FIG. 1.

Referring now to FIG. 3, in use, the controller node 114 may establish an environment 300 during operation. The environment 300 includes an SDN controller module 302, operatively coupled to a management port 328 for communicating data, such as REST APIs, to compute nodes (104-110). SDN controller module 302 may be configured as a strategic control point in an SDN network, relaying information to the switches/routers "below" (via southbound APIs) and the applications and logic "above" (via northbound APIs). In certain embodiments, SDN controller module 302 may be tasked with federating between SDN controller domains, using common application interfaces, such as OpenFlow and open virtual switch database (OVSDB). The SDN controller module 302 platform may also comprise a collection of "plug-in" modules that can perform different network tasks, including inventorying what devices are within the network and the capabilities of each, gathering network statistics, etc. Extensions can be inserted that enhance the functionality and support more advanced capabilities, such as running algorithms to perform analytics and orchestrating new rules throughout the network.

In certain embodiments, the SDN controller module 302 may communicate over the network using OpenFlow or OVSDB. In other embodiments, SDN controller module 302 may communicate over the network using other protocols such as YANG or NetConf, among others. The various modules of the environment 300 may be embodied as hardware, firmware, software, or a combination thereof. For example the various modules, logic, and other components of the environment 300 may form a portion of, or otherwise be established by the processor 150 or other hardware components of the controller node 114. As such, in some embodiments, any one or more of the modules of the environment 300 may be embodied as a circuit or collection of electrical devices (e.g., a SDN controller circuit, an update circuit).

The SDN controller module 302 further includes an update module 304 that is communicatively coupled to classifier rules database 306 and protocol descriptors database 308. As will be discussed in greater detail below, the update module may initiate configuration and/or updating of persistent instructions (e.g., firmware) for one or more NICs. In an illustrative embodiment, the controller node 114 begins NIC configuration by generating an AQ message describing a new protocol from database 308 using a protocol-specific language that can be compiled and loaded into the NIC 130 to update the programmable protocol parser module 202. AQ messages transmitted by the SDN controller module 302 are received in the compute node 104 via the management port 228 and transmitted to update the control module 236 for persistent instructions (e.g., firmware) 206. The update control module 236 processes the AQ message and, using protocol descriptors contained in the message, updates programmable protocol parser module 202 for persistent instructions (e.g., firmware) 206.

If the update is successful, the persistent instructions (e.g., firmware) 206 transmits an acknowledgement signal through the update control module 236 via the management port 228 to the controller node 114. If the update is not successful, persistent instructions (e.g., firmware) 206 transmits an error signal via management port 228 to controller node 114. After a successful update, the persistent instructions (e.g., firmware) 206 includes an update identifier, such as a protocol number, with the acknowledgement indicating the new protocol present on the NIC 130. Once the update identifier is received in the controller node 114, further AQ messages may be transmitted to the compute node 104 for configuring operation for NIC 130. In one embodiment, after receiving an update identifier, the SDN controller module 302 of the controller node 114 may transmit classification rules and queue assignments for an embedded switch of the NIC 130. In some embodiments, controller node 114 may be configured with a compiler module 310 that is coupled to update module 304. After generating a parse graph, controller node 114 may compile it locally using compiler module 310, provided there is information on the controller node 114 specifying the type of NIC (130) the parse graph will be pushed to. In such a configuration, compiler module 310 may be used instead of, or in addition to, compiler module 234 in FIG. 2.

The protocol specification language from the SDN controller module 302 may be configured to unambiguously describe a parse graph to be compiled by the compiler module 234 into device-specific microcode or low-level register instructions, and loaded into the NIC 130. This acts as a common high-level description between higher layer software and a hardware parser to describe the protocols in use. In addition to programming the flexible parser, the compiler module 234 may also generate a mapping between the user-provided protocols/fields and the internal labels used by the hardware. This advantageously simplifies software by allowing applications to use protocol/field names that are common to the environment instead of device specific protocol labels. This is particularly advantageous in large heterogeneous networks that may have many types of flexible parsers available. In certain embodiments, the compiler module 234 may be configured support multiple different hardware devices.

In an illustrative embodiment, during initial operation, protocol descriptors for one or more known protocols may be preloaded into a non-volatile memory (NVM), e.g., flash memory, of the NIC 130 (e.g., memory 132) for automatic configuration. In the presence of a preloaded NVM, the SDN controller module 302 would only need to program additional new protocols as they are introduced into the system. For example, customer-specific proprietary protocols, new standards and the like may be provided to the NIC 130 from the SDN controller module 302 after startup by extending the parse graph using the protocol specification language.

Figure 4:
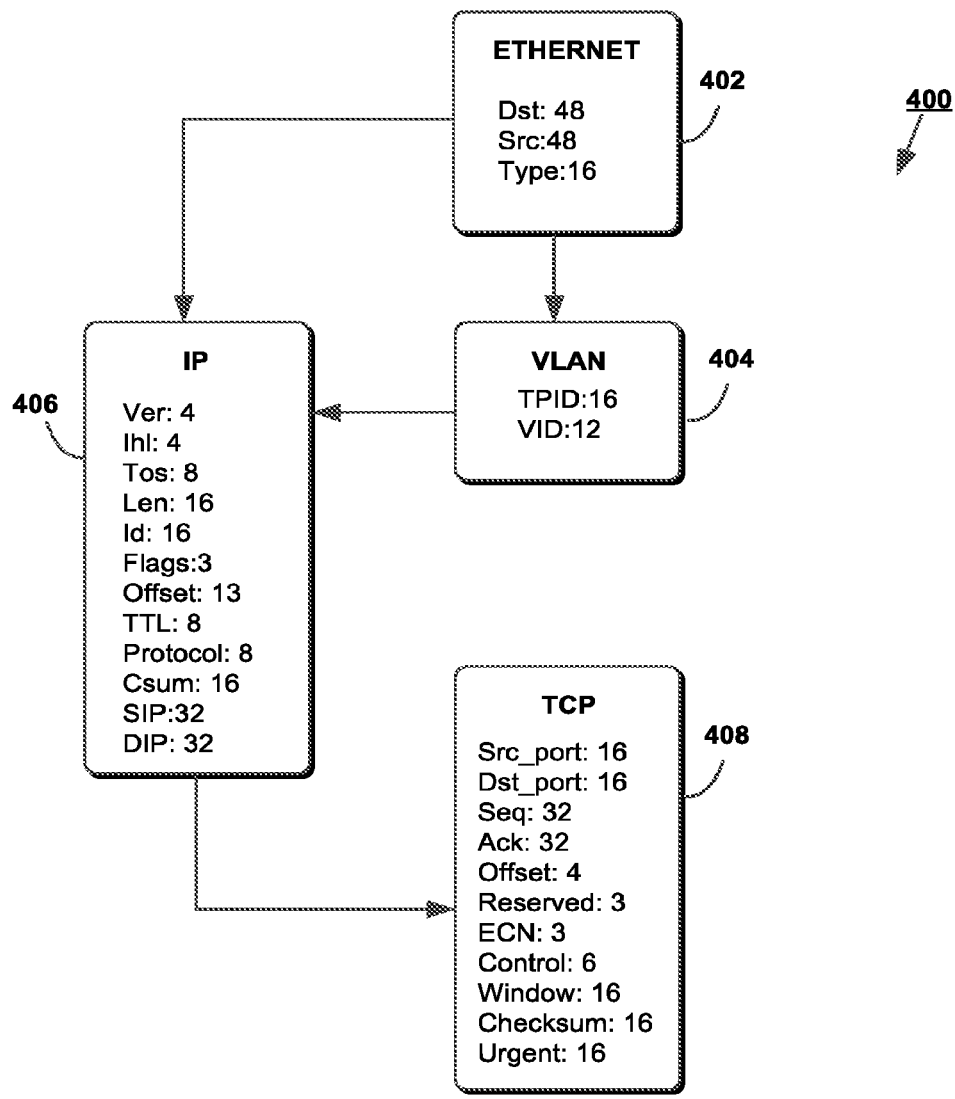
FIG. 4 is a simplified illustration of at least one embodiment of a protocol specification and actions messaging configuration for a controller node.

In a simplified example, the SDN controller module 302 may be configured under a HTTP protocol using the protocol specification language. An illustrative example 400 of such a protocol specification and actions message is provided in FIG. 4 showing one configuration for Ethernet 402, VLAN 404, IP 406 and TCP 408. The information illustrated 400 is compiled via the compiler module 234 into persistent instructions (e.g., firmware) 206 required by the compute node 104 (200). The compiler module 234 also generates a map table between a user-provided parse graph and labels on compute node 104 (200). In the example of FIG. 4, the illustrated configuration allows the creation of a match/action tuple such that TCP Destination Port field 80 is matched with an action to push traffic to queue 3. A compiler module 234 map function then translates the high level instructions into low level AQ commands, as illustrated in pertinent part below:

```
<parse_graph : text >
packet ether {dst:48 src:48 type:16};
packet vlan {VID:12;TPID:16} extends ether with type:0x8100;
packet ip {ver:4 ihl:4 tos:8 len:16 id:16 flags:3
    frag_offset:13 ttl:8 proto:8 csum:16
    sip:32 dip:32} extends ether with type:0x800
packet tcp {src_port:16 dport:16
    seq:32 ack:32
    offset:4 reserved:3
    ecn:3 control:6
    window:16 csum:16 urgent:16} extends ip with proto:6
packet http {<http-specification>} extends tcp with dport: 80
</parse_graph>
<actions : text>
type qselect = Queue of int
</actions>
<rule : text>
match http action qselect 3
</rule>
```

Figure 5:
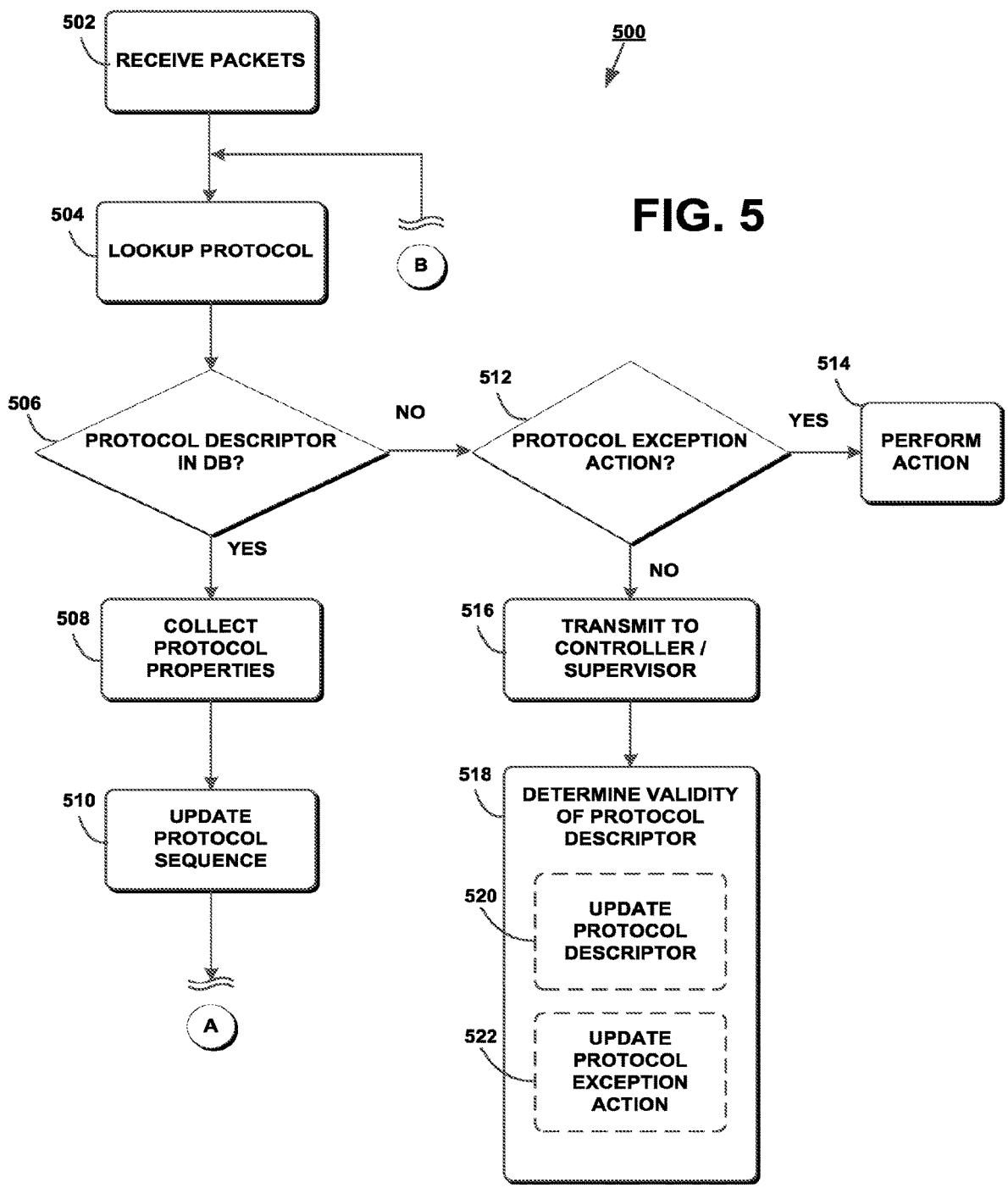
FIGS. 5 and 6 are a simplified flow diagram of at least one embodiment of a method for updating protocol sequences suitable for use in the embodiments of FIGS. 1-3.
Figure 6:
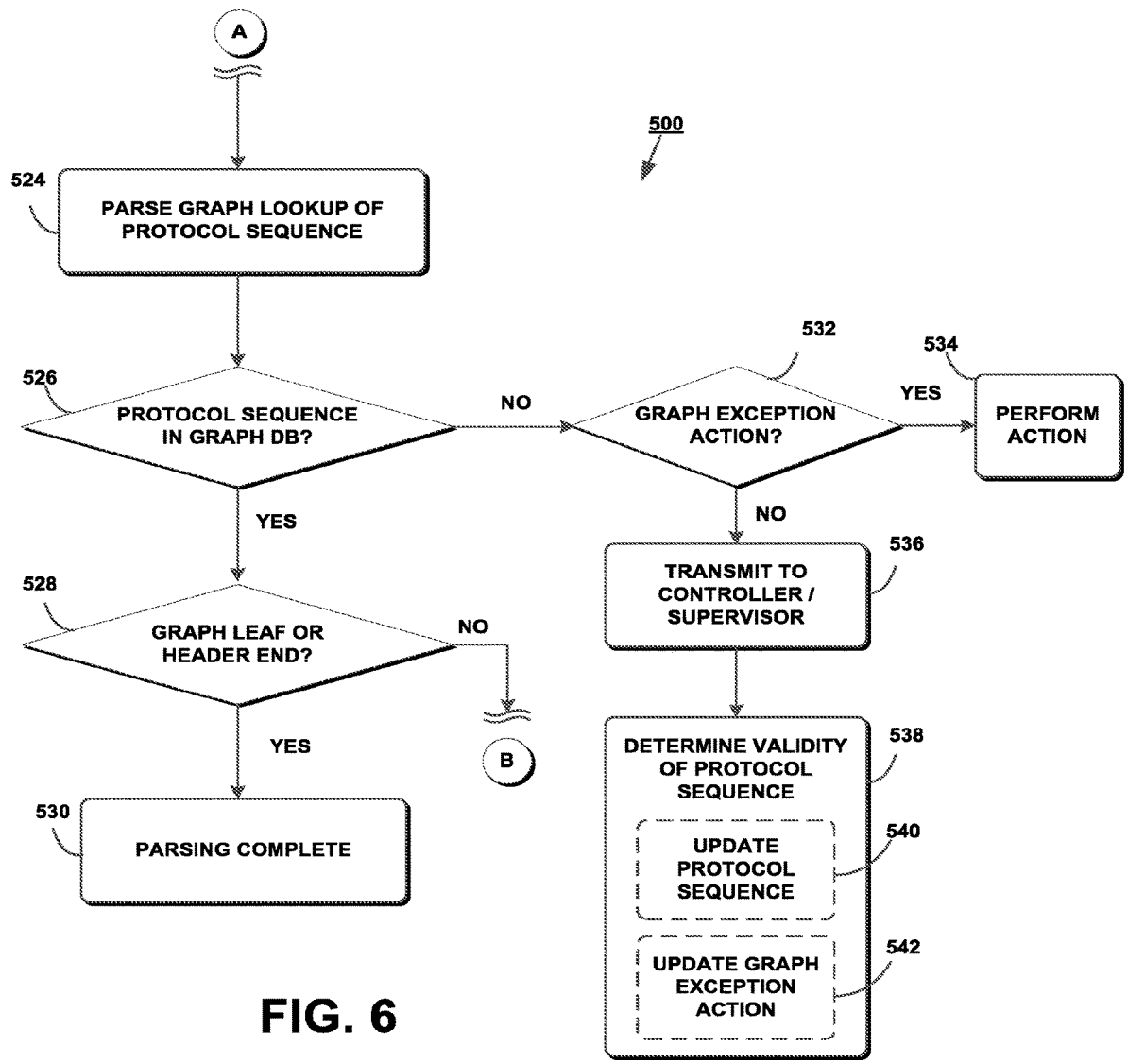

Referring now to FIGS. 5 and 6, in use, each NIC 130 may execute a method 500 for identifying and updating protocol sequences and protocol parsing. The illustrative method 500 begins with block 502 in which a packet is received by the NIC 130 and buffered. The programmable protocol parser module 202 performs a protocol lookup in block 504 to identify the structure of the packet (e.g., a sequence of protocol headers) and determine if the received protocol descriptor exists in a database in block 506. In one embodiment, a hardware-based programmable parser could provide packet parsing according to a programmable protocol descriptor database and parse graph database, such as paths on the graph that represent valid protocol sequences. If the protocol descriptor is found in the database ("YES"), the parser collects protocol properties in block 508 by producing metadata (e.g., offset, instance number, etc.) describing the protocols found in the packet, including new protocols derived from software via the protocol descriptors, and updates the protocol sequence(s) in block 510. The packet and the metadata may be transmitted to the NIC switch that classifies the packet and further assigns it to a required target queue. It should be appreciated by those skilled in the art that additional classification/filtering and packet modification may be performed as necessary. After updating the protocol sequence in block 510, the process proceeds with parsing ("A") described below in the illustrative embodiment of FIG. 6.

Referring back to block 506, if the protocol descriptor is not found in the database, ("NO") the protocol descriptor is further processed in block 512 to determine if a protocol (graph) exception action is defined or generated. A protocol exception may be defined such that an action is performed in block 514 when a type of protocol or sequence is detected. Some possible actions comprise discarding or capturing the frame. If in block 512 it is determined that a protocol exception is not defined, the received frame may be transmitted to controller/supervisor (i.e., controller node 114) in block 516 for further processing and to determine validity of protocol descriptor in block 518. In some instances, invalid protocols and/or sequences may be part of a DoS attack that would need to be identified. As the validity of protocol descriptors is determined, valid descriptors may be used to update protocol descriptor in block 520, while invalid descriptors may be used to update a protocol exception database in block 522.

Turning now to FIG. 6, after the protocol sequence is updated, a protocol parser may perform a parse graph lookup of protocol sequences in block 524 to determine if a protocol sequence is in a graph database in block 526. If the protocol sequence is recognized in block 526 ("YES"), the parser determines whether a graph leaf or header end has been reached in block 528. If the graph leaf or header end has been reached ("YES"), the parsing is completed in block 530. If the graph leaf or header end has not been reached ("NO"), the parsing returns back to block 504 via designator "B" to continue with a next protocol lookup. As can be appreciated by those skilled in the art, the process may repeat until a graph leaf or header end of the parser has been reached.

If, in block 526, a protocol sequence is not identified from the graph database ("NO"), the parser determines if a graph exception action is defined in block 532. If an exception action is defined ("YES"), the parser performs the action in block 534. Possible actions comprise discarding or capturing the frame containing the sequence. If in block 532 it is determined that a graph exception is not defined ("NO"), the received frame may be transmitted to controller/supervisor (i.e., controller node 114) in block 536 for further processing and to determine validity of protocol sequence in block 538. As the validity of protocol sequence is determined, valid sequences may be used to update protocol sequences in block 540, while invalid sequences may be used to update a graph exception database in block 542.

It should be appreciated by those skilled in the art that principles provided in the present disclosure may be further used in other applications, such as switches with NIC-like host-interfaces (e.g., Intel® Red Rock Canyon (RRC) architecture). As one example, a hybrid switch-NIC packet processing application can program a parser in the switch using protocol descriptors to support new protocols. Classification results from the switch tables may be conveyed to the host-interface section of the switch as metadata in an F-tag container where queue assignments in the host may be derived from the metadata carried in the F-Tag.

Utilizing the techniques described herein, one skilled in the art will recognize that the configurations provide administrators with improved flexibility in directing traffic to desired queues. From these queues traffic may be further directed to CPU Cores, NUMA Nodes, VMs and/or applications. Furthermore, in an SDN environment, a control plane having knowledge of the resources of a server (NUMA nodes, number of CPU cores, PCIe topology etc.), is able to direct traffic much more accurately and efficiently and maximize the use of resources. Moreover, actions such as ACL drops (i.e., pushing flows to an inactive queue that is not attended by higher level software) can be implemented alleviating concerns about denial of service (DoS) attacks. Furthermore, tag pushing and popping will be possible in hardware switches can add ("push"), remove ("pop") or modify single or multiple tags.

EXAMPLES

Illustrative examples of the technologies disclosed herein are provided below. An embodiment of the technologies may include any one or more, and any combination of, the examples described below.

Example 1 includes a networking device for controlling operation of a compute node coupled to a computer network, the networking device comprising a memory having stored therein persistent instructions such as firmware for providing control functions to the networking device, wherein the control functions are defined at least in part by protocol data; an update control module for receiving update data from a remote node in the computer network, the update data comprising new protocol data for the persistent instructions; a protocol parser module for parsing the update data and generating metadata relating to the update data without a reset of the networking device; a classifier module for receiving rules for the control functions, wherein the rules are based at least in part on the update data and metadata; and a compiler module for compiling the parsed update data to the persistent instructions for providing new control functions to the networking device based at least in part on the received rules.

Example 2 includes the subject matter of example 1, and wherein the new protocol data comprises a protocol specification language data relating to the persistent instructions.

Example 3 includes the subject matter of any of Examples 1 and 2, and wherein the new protocol data comprises a parse graph.

Example 4 includes subject matter of any of the Examples 1-3, and wherein the protocol data further comprises one of networking device-specific microcode and register parameters.

Example 5 includes the subject matter of any of the Examples 1-4, and wherein the new protocol data comprises protocol descriptors, and wherein the protocol parser module parses the update data using the protocol descriptors.

Example 6 includes the subject matter of any of the Examples 1-5, and wherein the protocol parser module parses the update data using protocol field extraction and packet type identification.

Example 7 includes the subject matter of any of the Examples 1-6, and wherein the remote node comprises a software defined networking (SDN) node.

Example 8 includes the subject matter of any of the Examples 1-7, and wherein the classifier module comprises at least one classifier switch and filter.

Example 9 includes the subject matter of any of the Examples 1-8, and wherein the compiler module is to generate a map for the parsed update data to at least a portion of the protocol data.

Example 10 includes the subject matter of any of the Examples 1-9, and wherein the networking device comprises a network interface controller.

Example 11 includes a network node for controlling operation of a networking device on a compute node coupled to a computer network, the network node comprising a memory having stored therein update data for updating persistent instructions of the networking device; and a controller module coupled to the memory, wherein the controller module is to retrieve update data from the memory and transmit the update data to the networking device, and wherein the update data comprises (i) new protocol data for controlling functions of the persistent instructions, the new protocol data comprising parseable and compilable protocol data and (ii) rules data relating to the new protocol data, the rules data comprising instructions for providing new control functions to the networking device based at least in part on the rules data.

Example 12 includes the subject matter of Example 11, and wherein the new protocol data comprises a protocol specification language data relating to the persistent instructions.

Example 13 includes the subject matter of any of Examples 10 and 11, and wherein the new protocol data comprises a parse graph.

Example 14 includes the subject matter of any of the Examples 11-13, and wherein the protocol data further comprises one of networking device-specific microcode and register parameters.

Example 15 includes the subject matter of any of the Examples 11-14, and wherein the new protocol data comprises parseable protocol descriptors.

Example 16 includes the subject matter of any of the Examples 11-15, and wherein the controller module is configured to receive an acknowledgement signal in response to transmitting the new protocol data, and wherein the controller module is configured to transmit the rules data after receiving the acknowledgement signal.

Example 17 includes the subject matter of any of the Examples 11-16, and wherein the network node comprises a software defined networking (SDN) node.

Example 18 includes the subject matter of any of the Examples 11-17, and wherein the memory comprises a protocol database for providing protocol data and a classifier database for providing rules data.

Example 19 includes the subject matter of any of the Examples 11-18, and wherein the networking device comprises a network interface controller.

Example 20 includes the subject matter of any of any of the Examples 11-19 and further a compiler module coupled to the controller module to compile the update data.

Example 21 includes a method for controlling operation of a compute node coupled to a computer network via a networking device, the method comprising providing, by the networking device, control functions to the networking device via persistent instructions, such as firmware, the control functions being defined at least in part by protocol data; receiving, by the networking device, update data from a remote node in the computer network, the update data comprising new protocol data for the persistent instructions;

parsing, by the networking device, the update data to generate metadata relating to the update data without a reset of the networking device; receiving, by the networking device, rules for the control functions, wherein the rules are based at least in part on the update data and metadata; and compiling, by the networking device, the parsed update data to the persistent instructions for providing new control functions to the networking device based at least in part on the received rules.

Example 22 includes the subject matter of example 210, and wherein receiving update data comprises receiving update data comprising new protocol data for the persistent instructions, the new protocol data comprising a protocol specification language data relating to the persistent instructions.

Example 23 includes the subject matter of any of Examples 21 and 22, and wherein receiving update data comprises receiving update data comprising new protocol data for the persistent instructions, the new protocol data comprising a parse graph.

Example 24 includes the subject matter of any of Examples 21-23, and wherein the new protocol data further comprises one of networking device-specific microcode and register parameters.

Example 25 includes the subject matter of any of Examples 21-24, and wherein the new protocol data comprises protocol descriptors, and wherein the update data is parsed by the protocol parser module using the protocol descriptors.

Example 26 includes the subject matter of any of Examples 21-25, and wherein the update data is parsed by the protocol parser module using protocol field extraction and packet type identification.

Example 27 includes the subject matter of any of Examples 21-26, and wherein the remote node comprises a software defined networking (SDN) node.

Example 28 includes the subject matter of any of Examples 21-27, and wherein the received rules comprises data relating to at least one classifier switch and filter in the classifier module.

Example 29 includes the subject matter of any of Examples 21-28, and further comprising generating a map via the compiler for the parsed update data to at least a portion of the protocol data.

Example 30 includes the subject matter of any of Examples 21-29, and wherein the networking device comprises a network interface controller.

Example 31 includes a method for controlling operation of a networking device on a compute node coupled to a computer network via a network node, comprising storing, in a memory of the network node, update data for updating persistent instructions such as firmware of the networking device; retrieving, by a controller module of the network node, update data from the memory; and transmitting, by the network node, the update data to the networking device, wherein the update data comprises (i) new protocol data for controlling functions of the persistent instructions, the new protocol data comprising parseable and compilable protocol data and (ii) rules data relating to the new protocol data, the rules data comprising instructions for providing new control functions to the networking device based at least in part on the rules data.

Example 32 includes the subject matter of example 31, and wherein transmitting the update data comprises transmitting the new protocol data, the new protocol data comprising a protocol specification language data relating to the persistent instructions.

Example 33 includes the subject matter of any of Examples 31 and 32, and wherein transmitting the update data comprises transmitting the new protocol data, the new protocol data comprising a parse graph.

Example 34 includes the subject matter of any of Examples 31-33, and wherein the new protocol data further comprises one of networking device-specific microcode and register parameters.

Example 35 includes the subject matter of any of Examples 31-34, and wherein the new protocol data comprises parseable protocol descriptors.

Example 36 includes the subject matter of any of Examples 31-35, and further comprising receiving, by the network node, an acknowledgement signal in response to transmitting the new protocol data, wherein transmitting the rules data occurs after receiving the acknowledgement signal.

Example 37 includes the subject matter of any of Examples 31-36, and wherein the network node comprises a software defined networking (SDN) node.

Example 38 includes the subject matter of any of Examples 31-37, and wherein storing update data for updating persistent instructions of the networking device comprises storing a protocol database of the memory for providing protocol data and storing a classifier database of the memory for providing rules data.

Example 39 includes the subject matter of any of Examples 31-38, and wherein the networking device comprises a network interface controller.

Example 40 includes the subject matter of any of Examples 31-39 and further including compiling the update data by a compiler module coupled to the controller module to compile the update data Example 41 includes one or more machine-readable media comprising a plurality of instructions stored thereon that, in response to execution by a computing device, causes the computing device to perform the method of any of Examples 21-40.

Example 40 includes a computing device for updating persistent instructions of a networking device of the computing device, the computing device comprising means for performing any of Examples 20-38.

Example 42 includes a networking device for controlling operation of a compute node coupled to a computer network. The networking device includes means for providing control functions to the networking device via persistent instructions such as firmware, the control functions being defined at least in part by protocol data; means for receiving update data from a remote node in the computer network, the update data comprising new protocol data for the persistent instructions; means for parsing the update data to generate metadata relating to the update data without a reset of the networking device; means for receiving rules for the control functions, wherein the rules are based at least in part on the update data and metadata; and means for compiling the parsed update data to the persistent instructions for providing new control functions to the networking device based at least in part on the received rules.

Example 43 includes the subject matter of Example 42, and wherein the means for receiving update data comprises means for receiving update data comprising new protocol data for the persistent instructions, the new protocol data comprising a protocol specification language data relating to the persistent instructions.

Example 44 includes the subject matter of any of Examples 42 or 43, and wherein the means for receiving update data comprises means for receiving update data comprising new protocol data for the persistent instructions, the new protocol data comprising a parse graph.

Example 45 includes the subject matter of any of Examples 42-44, and wherein the new protocol data further comprises one of networking device-specific microcode and register parameters.

Example 46 includes the subject matter of any of Examples 42-45, and wherein the new protocol data comprises protocol descriptors, and wherein the update data is parsed by the protocol parser module using the protocol descriptors.

Example 47 includes the subject matter of any of Examples 42-46, and wherein the update data is parsed by the protocol parser module using protocol field extraction and packet type identification.

Example 48 includes the subject matter of any of Examples 42-47, and wherein the remote node comprises a software defined networking (SDN) node.

Example 49 includes the subject matter of any of Examples 42-48, and wherein the received rules comprises data relating to at least one classifier switch and filter in the classifier module.

Example 50 includes the subject matter of any of Examples 42-49, and further comprising means for generating a map via the compiler for the parsed update data to at least a portion of the protocol data.

Example 51 includes the subject matter of any of Examples 42-50, and wherein the networking device comprises a network interface controller.

Example 52 includes a network node for controlling operation of a networking device on a compute node coupled to a computer network. The network node includes means for storing, in a memory of the network node, update data for updating persistent instructions of the networking device; means for retrieving update data from the memory; and means for transmitting the update data to the networking device, wherein the update data comprises (i) new protocol data for controlling functions of the persistent instructions, the new protocol data comprising parseable and compilable protocol data and (ii) rules data relating to the new protocol data, the rules data comprising instructions for providing new control functions to the networking device based at least in part on the rules data.

Example 53 includes the subject matter of Example 52, and wherein the means for transmitting the update data comprises means for transmitting the new protocol data, the new protocol data comprising a protocol specification language data relating to the persistent instructions.

Example 54 includes the subject matter of any of Examples 52 or 53, and wherein the means for transmitting the update data comprises means for transmitting the new protocol data, the new protocol data comprising a parse graph.

Example 55 includes the subject matter of any of Examples 52-54, and wherein the new protocol data further comprises one of networking device-specific microcode and register parameters.

Example 56 includes the subject matter of any of Examples 52-55, and wherein the new protocol data comprises parseable protocol descriptors.

Example 57 includes the subject matter of any of Examples 52-56, and further includes means for receiving an acknowledgement signal in response to transmitting the new protocol data, wherein transmitting the rules data occurs after receiving the acknowledgement signal.

Example 58 includes the subject matter of any of Examples 52-57, and wherein the network node comprises a software defined networking (SDN) node.

Example 59 includes the subject matter of any of Examples 52-58, and wherein the means for storing update data for updating persistent instructions of the networking device comprises means for storing a protocol database of the memory for providing protocol data and storing a classifier database of the memory for providing rules data.

Example 60 includes the subject matter of any of Examples 52-59, and wherein the networking device comprises a network interface controller.

Example 61 includes the subject matter of any of Examples 52-60, and further includes means for compiling the update data by a compiler module coupled to the controller module to compile the update data.

Example 62 includes a networking device for controlling operation of a compute node coupled to a computer network, the networking device comprising means for storing persistent instructions for providing control functions to the networking device, wherein the control functions are defined at least in part by protocol data; means for receiving update data from a remote node in the computer network, the update data comprising new protocol data for the persistent instructions; means for parsing the update data and generating metadata relating to the update data without a reset of the networking device; means for receiving rules for the control functions, wherein the rules are based at least in part on the update data and metadata; and means for compiling the parsed update data to the persistent instructions for providing new control functions to the networking device based at least in part on the received rules.

The invention claimed is:

1. A network device comprising physical layer and data link layer communication circuitry and being for use in receiving network traffic, the network device being usable in association with a remote controller that is to be communicatively coupled to the network device via at least one network, the network device comprising:

packet parser circuitry for use in (1) identifying and parsing at least one header of at least one incoming packet and (2) for generating output data for use in association with at least one packet switching-related operation, the packet parser circuitry being programmable, at least in part, based upon compilation of user-provided instructions in a language, the user-provided instructions being configurable to describe, at least in part, a parse graph, the parse graph being to define, at least in part, (1) header structure of the at least one incoming packet and/or (2) manner of parsing of the at least one header;

wherein:
the user-provided instructions also are configurable to describe match/action tuples that associate, at least in part, possible incoming packet characteristics with corresponding actions to be taken by the network device;
the corresponding actions comprise the at least one packet switching-related operation;
when the network device is in operation, the network device is to determine a particular action to take with respect to the at least one incoming packet based, at least in part, upon the output data and the match/action tuples; and
when the network device is in operation, the network device is programmable, at least in part, based upon control information to be provided to the network device from the remote controller via the at least one network.

2. The network device of claim 1, wherein:
the possible incoming packet characteristics comprise one or more of the following:
source port;
protocol type;
destination port;
source address; and
destination address.

3. The network device of claim 2, wherein:
the network device is useable in association with software-defined networking; and
the network device comprises embedded switch circuitry.

4. The network device of claim 3, wherein:
when the network device is in the operation, the network device is to receive the compilation from a computing device.

5. The network device of claim 4, wherein:
the compilation is to be generated, at least in part, by compiler software that is to be executed by the computing device, based upon the user-provided instructions; and
the compiler software is usable in programming multiple different hardware devices.

6. One or more non-transitory machine-readable storage media storing instructions for being executed by a network device, the network device comprising physical layer and data link layer communication circuitry, the network device being for use in receiving network traffic and also usable in association with a remote controller that is to be communicatively coupled to the network device via at least one network, the instructions when executed by the network device resulting in the network device being configured for performance of operations comprising:
identifying and parsing, by packet parser circuitry of the network device, at least one header of at least one incoming packet; and
generating, by the packet parser circuitry, output data for use in association with at least one packet switching-related operation, the packet parser circuitry being programmable, at least in part, based upon compilation of user-provided instructions in a language, the user-provided instructions being configurable to describe, at least in part, a parse graph, the parse graph being to define, at least in part, (1) header structure of the at least one incoming packet and/or (2) manner of parsing of the at least one header;
wherein:
the user-provided instructions also are configurable to describe match/action tuples that associate, at least in part, possible incoming packet characteristics with corresponding actions to be taken by the network device;
the corresponding actions comprise the at least one packet switching-related operation;
when the network device is in operation, the network device is to determine a particular action to take with respect to the at least one incoming packet based, at least in part, upon the output data and the match/action tuples; and
when the network device is in operation, the network device is programmable, at least in part, based upon control information to be provided to the network device from the remote controller via the at least one network.

7. The one or more non-transitory machine-readable storage media of claim 6, wherein:
the possible incoming packet characteristics comprise one or more of the following:
source port;
protocol type;
destination port;
source address; and
destination address.

8. The one or more non-transitory machine-readable storage media of claim 7, wherein:
the network device is useable in association with software-defined networking; and
the network device comprises embedded switch circuitry.

9. The one or more non-transitory machine-readable storage media of claim 8, wherein:
when the network device is in the operation, the network device is to receive the compilation from a computing device.

10. The one or more non-transitory machine-readable storage media of claim 9, wherein:
the compilation is to be generated, at least in part, by compiler software that is to be executed by the computing device, based upon the user-provided instructions; and
the compiler software is usable in programming multiple different hardware devices.

11. A method implemented, at least in part, by a network device, the network device comprising physical layer and data link layer communication circuitry, the network device being for use in receiving network traffic and also usable in association with a remote controller that is to be communicatively coupled to the network device via at least one network, the method comprising:
identifying and parsing, by packet parser circuitry of the network device, at least one header of at least one incoming packet; and
generating, by the packet parser circuitry, output data for use in association with at least one packet switching-related operation, the packet parser circuitry being programmable, at least in part, based upon compilation of user-provided instructions in a language, the user-provided instructions being configurable to describe, at least in part, a parse graph, the parse graph being to define, at least in part, (1) header structure of the at least one incoming packet and/or (2) manner of parsing of the at least one header;
wherein:
the user-provided instructions also are configurable to describe match/action tuples that associate, at least in part, possible incoming packet characteristics with corresponding actions to be taken by the network device;
the corresponding actions comprise the at least one packet switching-related operation;
when the network device is in operation, the network device is to determine a particular action to take with respect to the at least one incoming packet based, at least in part, upon the output data and the match/action tuples; and
when the network device is in operation, the network device is programmable, at least in part, based upon control information to be provided to the network device from the remote controller via the at least one network.

12. The method of claim 11, wherein:
the possible incoming packet characteristics comprise one or more of the following:
source port;
protocol type;
destination port;
source address; and
destination address.

13. The method of claim 12, wherein:
the network device is useable in association with software-defined networking; and
the network device comprises embedded switch circuitry.

14. The method of claim 13, wherein:
when the network device is in the operation, the network device is to receive the compilation from a computing device.

15. The method of claim 14, wherein:
the compilation is to be generated, at least in part, by compiler software that is to be executed by the computing device, based upon the user-provided instructions; and
the compiler software is usable in programming multiple different hardware devices.

16. A network device for use in receiving network traffic via at least one network, the network device comprising:
packet parser circuitry for use in (1) identifying and parsing at least one header of at least one incoming packet and (2) for generating output data for use in association with at least one packet switching-related operation, the packet parser circuitry being programmable, at least in part, based upon compilation of user-provided instructions in a language, the user-provided instructions being configurable to describe, at least in part, a parse graph, the parse graph being to define, at least in part, (1) header structure of the at least one incoming packet and/or (2) manner of parsing of the at least one header;
wherein:
the user-provided instructions also are configurable to describe match/action tuples that associate, at least in part, possible incoming packet characteristics with corresponding actions to be taken by the network device;
the corresponding actions comprise the at least one packet switching-related operation; and
when the network device is in operation, the network device is to determine a particular action to take with respect to the at least one incoming packet based, at least in part, upon the output data and the match/action tuples.

17. The network device of claim 16, wherein:
the possible incoming packet characteristics comprise one or more of the following:
source port;
protocol type;
destination port;
source address; and
destination address.

18. The network device of claim 17, wherein:
the network device comprises embedded switch circuitry.

19. The network device of claim 18, wherein:
when the network device is in the operation, the network device is to receive the compilation from a computing device.

20. The network device of claim 19, wherein:
the compilation is to be generated, at least in part, by compiler software that is to be executed by the computing device, based upon the user-provided instructions.

21. One or more non-transitory machine-readable storage media storing instructions for being executed by a network device, the network device for use in receiving network traffic via at least one network, the instructions when executed by the network device resulting in the network device being configured for performance of operations comprising:
identifying and parsing, by packet parser circuitry of the network device, at least one header of at least one incoming packet; and
generating, by the packet parser circuitry, output data for use in association with at least one packet switching-related operation, the packet parser circuitry being programmable, at least in part, based upon compilation of user-provided instructions in a language, the user-provided instructions being configurable to describe, at least in part, a parse graph, the parse graph being to define, at least in part, (1) header structure of the at least one incoming packet and/or (2) manner of parsing of the at least one header;
wherein:
the user-provided instructions also are configurable to describe match/action tuples that associate, at least in part, possible incoming packet characteristics with corresponding actions to be taken by the network device;
the corresponding actions comprise the at least one packet switching-related operation; and
when the network device is in operation, the network device is to determine a particular action to take with respect to the at least one incoming packet based, at least in part, upon the output data and the match/action tuples.

22. The one or more non-transitory machine-readable storage media of claim 21, wherein:
the possible incoming packet characteristics comprise one or more of the following:
source port;
protocol type;
destination port;
source address; and
destination address.

23. The one or more non-transitory machine-readable storage media of claim 22, wherein:
the network device comprises embedded switch circuitry.

24. The one or more non-transitory machine-readable storage media of claim 23, wherein:
when the network device is in the operation, the network device is to receive the compilation from a computing device.

25. The one or more non-transitory machine-readable storage media of claim 24, wherein:
the compilation is to be generated, at least in part, by compiler software that is to be executed by the computing device, based upon the user-provided instructions.

26. A method implemented, at least in part, by a network device, the network device for use in receiving network traffic via at least one network, the method comprising:
identifying and parsing, by packet parser circuitry of the network device, at least one header of at least one incoming packet; and generating, by the packet parser circuitry, output data for use in association with at least one packet switching-related operation, the packet parser circuitry being programmable, at least in part, based upon compilation of user-provided instructions in a language, the user-provided instructions being configurable to describe, at least in part, a parse graph, the parse graph being to define, at least in part, (1) header structure of the at least one incoming packet and/or (2) manner of parsing of the at least one header;

wherein:

the user-provided instructions also are configurable to describe match/action tuples that associate, at least in part, possible incoming packet characteristics with corresponding actions to be taken by the network device;

the corresponding actions comprise the at least one packet switching-related operation; and when the network device is in operation, the network device is to determine a particular action to take with respect to the at least one incoming packet based, at least in part, upon the output data and the match/action tuples.

27. The method of claim 26, wherein:

the possible incoming packet characteristics comprise one or more of the following:

source port;

protocol type;

destination port;

source address; and destination address.

28. The method of claim 27, wherein:

the network device comprises embedded switch circuitry.

29. The method of claim 28, wherein:

when the network device is in the operation, the network device is to receive the compilation from a computing device.

30. The method of claim 29, wherein:

the compilation is to be generated, at least in part, by compiler software that is to be executed by the computing device, based upon the user-provided instructions.

* * * * *